(12) United States Patent
Bosch et al.

(10) Patent No.: US 10,361,969 B2
(45) Date of Patent: Jul. 23, 2019

(54) SYSTEM AND METHOD FOR MANAGING CHAINED SERVICES IN A NETWORK ENVIRONMENT

(71) Applicant: CISCO TECHNOLOGY, INC., San Jose, CA (US)

(72) Inventors: Hendrikus G. P. Bosch, Aalsmeer (NL); Jeffrey Napper, CL Delft (NL); Surendra M. Kumar, San Ramon, CA (US); Alessandro Duminuco, Milan (IT); Sape Jurriën Mullender, Amsterdam (NL); Humberto J. La Roche, Ocean, NJ (US); Louis Gwyn Samuel, Swindon (GB); Frank Brockners, Köln (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/252,028

(22) Filed: Aug. 30, 2016

(65) Prior Publication Data

US 2018/0063018 A1 Mar. 1, 2018

(51) Int. Cl.
*H04L 12/917* (2013.01)
*H04L 12/911* (2013.01)
(Continued)

(52) U.S. Cl.
CPC ............ *H04L 47/76* (2013.01); *H04L 45/306* (2013.01); *H04L 47/822* (2013.01); *H04L 47/28* (2013.01)

(58) Field of Classification Search
None
See application file for complete search history.

(56) References Cited

U.S. PATENT DOCUMENTS 3,629,512 A 12/1971 Yuan
4,769,811 A 9/1988 Eckberg, Jr. et al.
(Continued)

OTHER PUBLICATIONS

USPTO Jul. 8, 2016 Non-Final Office Action from U.S. Appl. No. 14/684,363.
(Continued)

*Primary Examiner* — Christine T Duong
(74) *Attorney, Agent, or Firm* — Patterson + Sheridan, LLP

(57) ABSTRACT

An example method is provided in one example embodiment and may include configuring a measurement indication for a packet; forwarding the packet through a service chain comprising one or more service functions; recording measurement information for the packet as it is forwarded through the service chain; and managing capacity for the service chain based, at least in part, on the measurement information. In some cases, the method can include determining end-to-end measurement information for the service chain using the recorded measurement information. In some cases, managing capacity for the service chain can further include identifying a particular service function as a bottleneck service function for the service chain; and increasing capacity for the bottleneck service. In various instances, increasing capacity for the bottleneck service can include at least one of: instantiating additional instances of the bottleneck service; and instantiating additional instances of the service chain.

19 Claims, 13 Drawing Sheets

(51) Int. Cl.
*H04L 12/725* (2013.01)
*H04L 12/841* (2013.01)

(56) References Cited

U.S. PATENT DOCUMENTS

| | | | |
|---|---|---|---|
| 5,408,231 A | 4/1995 | Bowdon | |
| 5,491,690 A | 2/1996 | Alfonsi et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |
| 6,400,681 B1 | 6/2002 | Bertin et al. | |
| 6,661,797 B1 | 12/2003 | Goel et al. | |
| 6,687,229 B1 | 2/2004 | Kataria et al. | |
| 6,799,270 B1 | 9/2004 | Bull et al. | |
| 6,888,828 B1 | 5/2005 | Partanen et al. | |
| 6,993,593 B2 | 1/2006 | Iwata | |
| 7,027,408 B2 | 4/2006 | Nabkel et al. | |
| 7,062,567 B2 | 6/2006 | Benitez et al. | |
| 7,095,715 B2 | 8/2006 | Buckman et al. | |
| 7,096,212 B2 | 8/2006 | Tribble et al. | |
| 7,139,239 B2 | 11/2006 | McFarland | |
| 7,165,107 B2 | 1/2007 | Pouyoul et al. | |
| 7,197,008 B1 | 3/2007 | Shabtay et al. | |
| 7,197,660 B1 | 3/2007 | Liu et al. | |
| 7,209,435 B1 | 4/2007 | Kuo et al. | |
| 7,227,872 B1 | 6/2007 | Biswas | |
| 7,231,462 B2 | 6/2007 | Berthaud et al. | |
| 7,333,990 B1 | 2/2008 | Thiagarajan | |
| 7,443,796 B1 | 10/2008 | Albert et al. | |
| 7,458,084 B2 | 11/2008 | Zhang et al. | |
| 7,486,622 B2 | 2/2009 | Regan et al. | |
| 7,536,396 B2 | 5/2009 | Johnson et al. | |
| 7,558,261 B2 | 7/2009 | Arregoces et al. | |
| 7,567,504 B2 | 7/2009 | Darling et al. | |
| 7,571,470 B2 | 8/2009 | Arregoces et al. | |
| 7,573,879 B2 | 8/2009 | Narad | |
| 7,610,375 B2 | 10/2009 | Portolani et al. | |
| 7,643,468 B1 | 1/2010 | Arregoces et al. | |
| 7,644,182 B2 | 1/2010 | Banerjee | |
| 7,647,422 B2 | 1/2010 | Singh et al. | |
| 7,657,940 B2 | 2/2010 | Portolani et al. | |
| 7,668,116 B2 | 2/2010 | Wijnands et al. | |
| 7,684,321 B2 | 3/2010 | Muirhead et al. | |
| 7,738,469 B1 | 6/2010 | Shekokar et al. | |
| 7,814,284 B1 | 10/2010 | Glass et al. | |
| 7,831,693 B2 | 11/2010 | Lai | |
| 7,860,095 B2 | 12/2010 | Forissier et al. | |
| 7,860,100 B2 | 12/2010 | Khalid et al. | |
| 7,895,425 B2 | 2/2011 | Khalid et al. | |
| 7,899,012 B2 | 3/2011 | Ho et al. | |
| 7,899,861 B2 | 3/2011 | Feblowitz et al. | |
| 7,907,595 B2 | 3/2011 | Khanna et al. | |
| 7,983,174 B1 | 7/2011 | Monaghan et al. | |
| 7,990,847 B1 | 8/2011 | Leroy et al. | |
| 8,000,329 B2 | 8/2011 | Fendick et al. | |
| 8,018,938 B1 | 9/2011 | Fromm et al. | |
| 8,094,575 B1 | 1/2012 | Vadlakonka | |
| 8,166,465 B2 | 4/2012 | Feblowitz et al. | |
| 8,180,909 B2 | 5/2012 | Hartman et al. | |
| 8,195,774 B2 | 6/2012 | Lambeth et al. | |
| 8,280,354 B2 | 10/2012 | Smith et al. | |
| 8,281,302 B2 | 10/2012 | Durazzo et al. | |
| 8,291,108 B2 | 10/2012 | Raja et al. | |
| 8,305,900 B2 | 11/2012 | Bianconi | |
| 8,311,045 B2 | 11/2012 | Quinn et al. | |
| 8,316,457 B1 | 11/2012 | Paczkowski et al. | |
| 8,442,043 B2 | 5/2013 | Sharma et al. | |
| 8,464,336 B2 | 6/2013 | Wei et al. | |
| 8,520,672 B2 | 8/2013 | Guichard et al. | |
| 8,601,152 B1 | 12/2013 | Chou | |
| 8,612,612 B1 | 12/2013 | Dukes et al. | |
| 8,676,980 B2 | 3/2014 | Kreeger et al. | |
| 8,700,892 B2 | 4/2014 | Bollay | |
| 8,730,980 B2 | 5/2014 | Bagepalli et al. | |
| 8,743,885 B2 | 6/2014 | Khan et al. | |
| 8,751,420 B2 | 6/2014 | Hjelm et al. | |
| 8,762,534 B1 | 6/2014 | Hong et al. | |
| 8,762,707 B2 | 6/2014 | Killian | |
| 8,792,490 B2 | 7/2014 | Jabr et al. | |
| 8,793,400 B2 | 7/2014 | McDysan | |
| 8,825,070 B2 | 9/2014 | Akhtar et al. | |
| 8,830,834 B2 | 9/2014 | Sharma et al. | |
| 8,904,037 B2 | 12/2014 | Haggar et al. | |
| 9,001,827 B2 | 4/2015 | Appenzeller | |
| 9,071,533 B2 | 6/2015 | Hui et al. | |
| 9,077,661 B2 | 7/2015 | Andreasen et al. | |
| 9,088,584 B2 | 7/2015 | Feng et al. | |
| 9,130,872 B2 | 9/2015 | Kumar et al. | |
| 9,143,438 B2 | 9/2015 | Khan et al. | |
| 9,160,797 B2 | 10/2015 | McDysan | |
| 9,178,812 B2 | 11/2015 | Guichard et al. | |
| 9,253,274 B2 | 2/2016 | Quinn et al. | |
| 9,300,585 B2 | 3/2016 | Kumar et al. | |
| 9,344,337 B2 | 5/2016 | Kumar et al. | |
| 9,374,297 B2 | 6/2016 | Bosch et al. | |
| 9,379,931 B2 | 6/2016 | Bosch et al. | |
| 9,398,486 B2 | 7/2016 | La Roche, Jr. et al. | |
| 9,413,655 B2 | 8/2016 | La Roche, Jr. et al. | |
| 9,479,443 B2 | 10/2016 | Bosch et al. | |
| 2001/0023442 A1 | 9/2001 | Masters | |
| 2002/0131362 A1 | 9/2002 | Callon | |
| 2002/0156893 A1 | 10/2002 | Pouyoul et al. | |
| 2002/0167935 A1 | 11/2002 | Nabkel et al. | |
| 2003/0023879 A1 | 1/2003 | Wray | |
| 2003/0088698 A1 | 5/2003 | Singh et al. | |
| 2003/0110081 A1 | 6/2003 | Tosaki | |
| 2003/0120816 A1 | 6/2003 | Berthaud et al. | |
| 2003/0226142 A1 | 12/2003 | Rand | |
| 2004/0109412 A1 | 6/2004 | Hansson | |
| 2004/0148391 A1 | 7/2004 | Lake et al. | |
| 2004/0199812 A1 | 10/2004 | Earl et al. | |
| 2004/0264481 A1 | 12/2004 | Darling et al. | |
| 2004/0268357 A1 | 12/2004 | Joy et al. | |
| 2005/0044197 A1 | 2/2005 | Lai | |
| 2005/0086367 A1 | 4/2005 | Conta et al. | |
| 2005/0152378 A1 | 7/2005 | Bango et al. | |
| 2005/0160180 A1 | 7/2005 | Rabje et al. | |
| 2005/0204042 A1 | 9/2005 | Banerjee | |
| 2005/0257002 A1 | 11/2005 | Nguyen | |
| 2005/0281257 A1 | 12/2005 | Yazaki et al. | |
| 2005/0286540 A1 | 12/2005 | Hurtta et al. | |
| 2005/0289244 A1 | 12/2005 | Sahu et al. | |
| 2006/0005240 A1 | 1/2006 | Sundarrajan | |
| 2006/0045024 A1 | 3/2006 | Previdi et al. | |
| 2006/0074502 A1 | 4/2006 | McFarland | |
| 2006/0092950 A1 | 5/2006 | Arregoces et al. | |
| 2006/0095960 A1 | 5/2006 | Arregoces et al. | |
| 2006/0112400 A1 | 5/2006 | Zhang et al. | |
| 2006/0168223 A1 | 7/2006 | Mishra et al. | |
| 2006/0233106 A1 | 10/2006 | Achlioptas et al. | |
| 2006/0233155 A1 | 10/2006 | Srivastava | |
| 2007/0061441 A1 | 3/2007 | Landis et al. | |
| 2007/0067435 A1 | 3/2007 | Landis et al. | |
| 2007/0143851 A1 | 6/2007 | Nicodemus et al. | |
| 2007/0237147 A1 | 10/2007 | Quinn et al. | |
| 2007/0250836 A1 | 10/2007 | Li et al. | |
| 2008/0080509 A1 | 4/2008 | Khanna et al. | |
| 2008/0080517 A1 | 4/2008 | Roy et al. | |
| 2008/0170542 A1 | 7/2008 | Hu | |
| 2008/0177896 A1 | 7/2008 | Quinn | |
| 2008/0181118 A1 | 7/2008 | Sharma | |
| 2008/0196083 A1 | 8/2008 | Parks et al. | |
| 2008/0209039 A1 | 8/2008 | Tracey et al. | |
| 2008/0219287 A1 | 9/2008 | Krueger et al. | |
| 2008/0225710 A1 | 9/2008 | Raja et al. | |
| 2008/0291910 A1 | 11/2008 | Tadimeti et al. | |
| 2009/0003364 A1 | 1/2009 | Fendick et al. | |
| 2009/0006152 A1 | 1/2009 | Timmerman et al. | |
| 2009/0204612 A1 | 8/2009 | Keshavarz-Nia et al. | |
| 2009/0300207 A1 | 12/2009 | Giaretta | |
| 2009/0300407 A1 | 12/2009 | Kamath et al. | |
| 2009/0305699 A1 | 12/2009 | Deshpande | |
| 2009/0328054 A1 | 12/2009 | Paramasivam et al. | |

(56) References Cited

U.S. PATENT DOCUMENTS

| | | |
|---|---|---|
| 2010/0054260 A1 | 3/2010 | Pandey et al. |
| 2010/0063988 A1 | 3/2010 | Khalid |
| 2010/0080226 A1 | 4/2010 | Khalid et al. |
| 2010/0165985 A1 | 7/2010 | Sharma et al. |
| 2010/0214949 A1 | 8/2010 | Smith et al. |
| 2010/0254385 A1 | 10/2010 | Sharma et al. |
| 2010/0318784 A1 | 12/2010 | Rao et al. |
| 2011/0023090 A1 | 1/2011 | Asati et al. |
| 2011/0032833 A1 | 2/2011 | Zhang et al. |
| 2011/0055845 A1 | 3/2011 | Nandagopal |
| 2011/0131338 A1 | 6/2011 | Hu |
| 2011/0161494 A1 | 6/2011 | McDysan |
| 2011/0167471 A1 | 7/2011 | Riley et al. |
| 2011/0184807 A1 | 7/2011 | Wang et al. |
| 2011/0235508 A1 | 9/2011 | Goel |
| 2011/0246899 A1 | 10/2011 | Kwon et al. |
| 2011/0255538 A1 | 10/2011 | Srinivasan |
| 2011/0264905 A1 | 10/2011 | Ovsiannikov |
| 2011/0320580 A1 | 12/2011 | Zhou |
| 2012/0030365 A1 | 2/2012 | Lidstrom et al. |
| 2012/0087262 A1 | 4/2012 | Rasanen |
| 2012/0131662 A1 | 5/2012 | Kuik |
| 2012/0185853 A1 | 7/2012 | Haviv et al. |
| 2012/0278804 A1 | 11/2012 | Narayanasamy et al. |
| 2012/0281540 A1 | 11/2012 | Khan |
| 2012/0281544 A1 | 11/2012 | Anepu |
| 2012/0327767 A1 | 12/2012 | Ramakrishnan |
| 2012/0327947 A1 | 12/2012 | Cai |
| 2012/0331135 A1 | 12/2012 | Alon et al. |
| 2013/0003735 A1 | 1/2013 | Chao et al. |
| 2013/0003736 A1 | 1/2013 | Szyszko |
| 2013/0031271 A1 | 1/2013 | Bosch et al. |
| 2013/0040640 A1 | 2/2013 | Chen et al. |
| 2013/0044636 A1 | 2/2013 | Koponen |
| 2013/0086236 A1 | 4/2013 | Baucke et al. |
| 2013/0097323 A1 | 4/2013 | Barsness et al. |
| 2013/0121137 A1 | 5/2013 | Feng et al. |
| 2013/0121207 A1 | 5/2013 | Parker |
| 2013/0124708 A1 | 5/2013 | Lee |
| 2013/0125124 A1 | 5/2013 | Kempf et al. |
| 2013/0155902 A1 | 6/2013 | Feng et al. |
| 2013/0163594 A1 | 6/2013 | Sharma |
| 2013/0163606 A1 | 6/2013 | Bagepalli et al. |
| 2013/0188554 A1 | 7/2013 | Cai |
| 2013/0198412 A1 | 8/2013 | Saito |
| 2013/0215215 A1 | 8/2013 | Gage et al. |
| 2013/0215888 A1 | 8/2013 | Zhang et al. |
| 2013/0223290 A1 | 8/2013 | Zhou |
| 2013/0223449 A1 | 8/2013 | Koganti et al. |
| 2013/0235874 A1 | 9/2013 | Ringdahl et al. |
| 2013/0238774 A1 | 9/2013 | Davison et al. |
| 2013/0272305 A1 | 10/2013 | Lefebvre et al. |
| 2013/0279503 A1 | 10/2013 | Chiabaut |
| 2013/0311675 A1 | 11/2013 | Kancherla |
| 2013/0329584 A1 | 12/2013 | Ghose |
| 2014/0010085 A1 | 1/2014 | Kavunder et al. |
| 2014/0036730 A1 | 2/2014 | Nellikar |
| 2014/0050223 A1 | 2/2014 | Foo et al. |
| 2014/0059544 A1 | 2/2014 | Koganty et al. |
| 2014/0079070 A1 | 3/2014 | Sonoda et al. |
| 2015/0271203 A1 | 9/2015 | Duminuco et al. |
| 2015/0271204 A1 | 9/2015 | Duminuco et al. |
| 2015/0271205 A1 | 9/2015 | Duminuco et al. |
| 2015/0312801 A1 | 10/2015 | Khan et al. |
| 2015/0333930 A1 | 11/2015 | Aysola |
| 2015/0334027 A1 | 11/2015 | Bosch et al. |
| 2015/0334595 A1 | 11/2015 | Bosch et al. |
| 2015/0365322 A1 | 12/2015 | Shatzkamer et al. |
| 2016/0099853 A1 | 4/2016 | Nedeltchev et al. |
| 2016/0139939 A1 | 5/2016 | Bosch et al. |
| 2016/0149788 A1* | 5/2016 | Zhang ................... H04L 43/10 709/224 |
| 2016/0179582 A1* | 6/2016 | Skerry ................. G06F 9/5077 718/1 |
| 2017/0078176 A1* | 3/2017 | Lakshmikantha .. H04L 43/0852 |
| 2017/0093677 A1* | 3/2017 | Skerry ................... H04L 43/12 |

OTHER PUBLICATIONS

U.S. Appl. No. 14/717,887, filed May 20, 2015, entitled "System and Method to Facilitate the Assignment of Service Functions for Service Chains in a Network Environment," Inventor(s): Robert M. Batz, et al.

U.S. Appl. No. 14/728,010, filed Jun. 2, 2015, entitled "System and Method to Facilitate the Assignment of Service Functions for Service Chains in a Network Environment," Inventors: Robert M. Batz et al.

U.S. Appl. No. 15/171,892, filed Jun. 2, 2016, entitled "System and Method for Hosting Mobile Packet Core and Value-Added Services Using a Software Defined Network and Service Chains," Inventor(s): Hendrikus G.P. Bosch, et al.

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.

3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Valbonne—France, Sep. 2005; 30 pages.

3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Valbonne—France, Mar. 2010; 116 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.

* cited by examiner

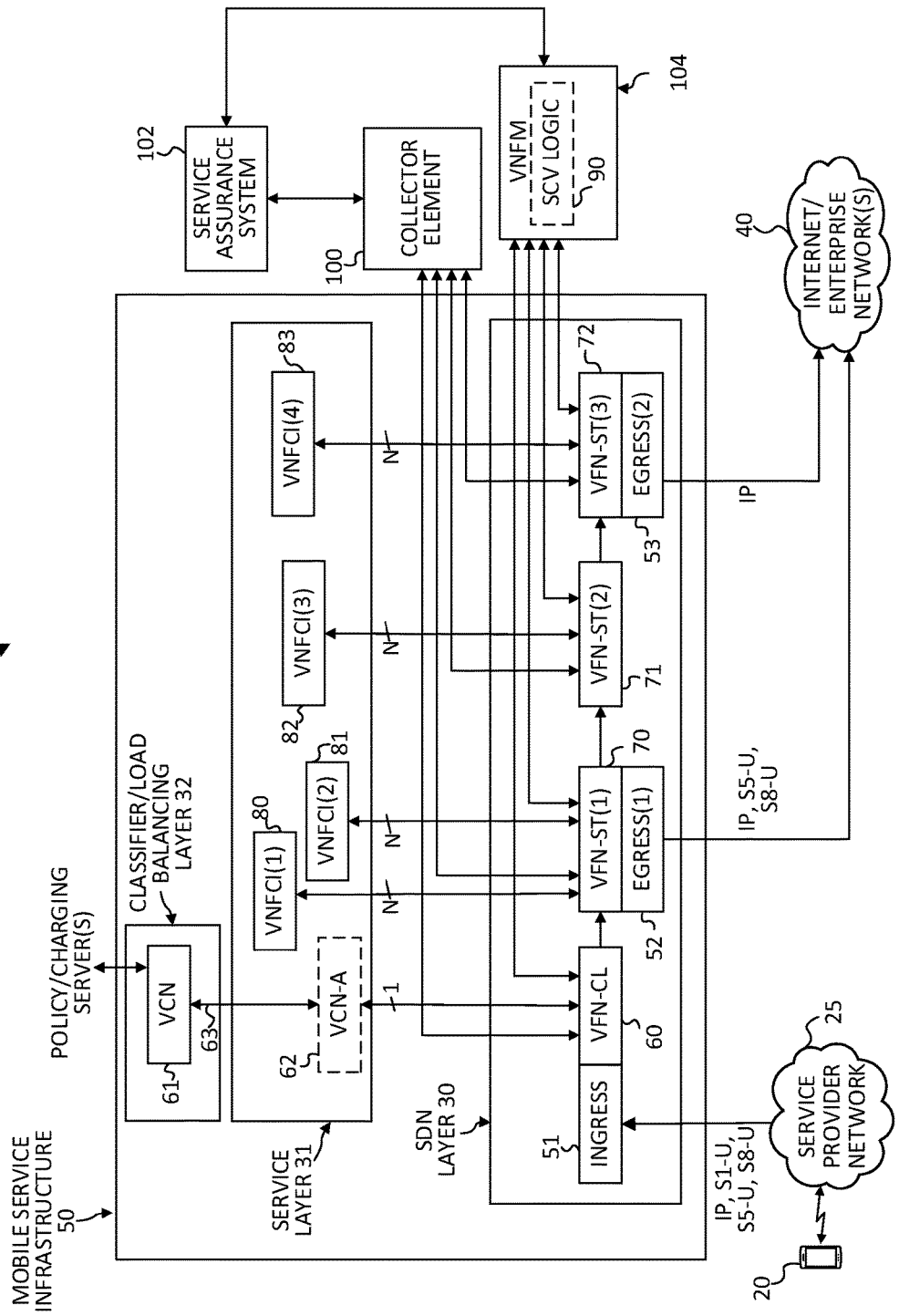

600

SYSTEM AND METHOD FOR MANAGING CHAINED SERVICES IN A NETWORK ENVIRONMENT

TECHNICAL FIELD

This disclosure relates in general to the field of communications and, more particularly, to a system and method for managing chained services in a network environment.

BACKGROUND

Networking architectures have grown increasingly complex in communication environments. Data traffic has grown extensively in recent years, which has significantly increased the demands on network resources. Network operators often provide differentiated services to mobile subscribers according to one or more policies for the subscribers. As the number of mobile subscribers and the number of operator services provided to mobile subscribers increases, efficient management of communication resources becomes even more critical. In some instances, providing multiple services to multiple subscribers may cause network equipment to be overwhelmed, provide sub-optimal performance or create congestion in the network. Accordingly, there are significant challenges in managing and scaling network resource, particularly when services are chained together in a service chain.

BRIEF DESCRIPTION OF THE DRAWINGS

To provide a more complete understanding of the present disclosure and features and advantages thereof, reference is made to the following detailed description, taken in conjunction with the accompanying figures, wherein like reference numerals represent like parts, in which:

FIG. 1A is a simplified block diagram illustrating a communication system to facilitate managing chained services in a network environment according to one embodiment of the present disclosure;

DETAILED DESCRIPTION OF EXAMPLE EMBODIMENTS

Overview

Figure 1B:
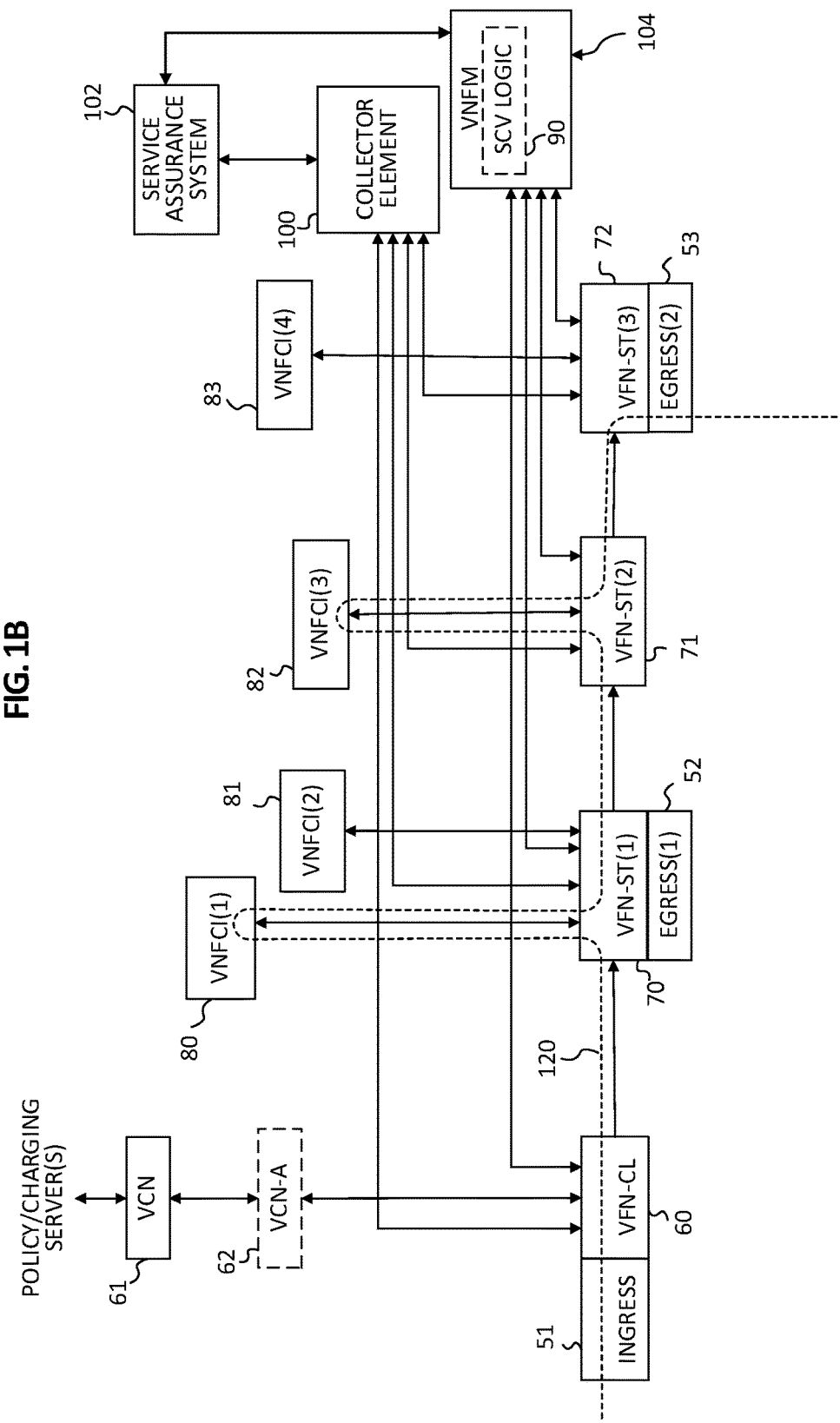
FIG. 1B is a simplified block diagram of an example service chain flow that can be provided in accordance with one potential embodiment of the communication system.

A method is provided in one example embodiment and may include configuring a measurement indication for a packet; forwarding the packet through a service chain comprising one or more service functions; recording measurement information for the packet as it is forwarded through the service chain; and managing capacity for the service chain based, at least in part, on the measurement information. In some cases, the method can include determining end-to-end measurement information for the service chain using the recorded measurement information. In some cases, managing capacity for the service chain can further include identifying a particular service function as a bottleneck service function for the service chain; and increasing capacity for the bottleneck service. In various instances, increasing capacity for the bottleneck service can include at least one of: instantiating additional instances of the bottleneck service; and instantiating additional instances of the service chain.

In some cases, managing capacity for the service chain can further include identifying that a particular service function or the service chain is underutilized; and decreasing capacity for the particular service function or the service chain. In some instances, decreasing capacity for the particular service function or service chain can include cancelling the particular service function or service chain. In some cases, the method can include determining whether the packet has not been processed by a particular service function of the service chain; and collecting the measurement information for the particular service function if the packet has not been processed by the particular service function.

In some cases, configuring the measurement indication for the packet can includes setting an Operations and Administration (OAM) bit within a Network Service Header that is encapsulated with the packet. In various instances, measurement information can include one or more of: a time stamp associated with a time when the packet is received at an ingress interface associated with the service chain; a time stamp associated with a time when the packet is received by a forwarding node associated with a particular service function of the service chain; a time stamp associated with a time when the packet is placed in an output queue of a forwarding node to be sent to a particular service function of the service chain associated with the forwarding node; a time stamp associated with a time when the packet is received from a particular service function by a forwarding node associated with the particular service function of the service chain; and a time stamp associated with a time when the packet is added to an output queue for an egress interface associated with the service chain.

Example Embodiments

For purposes of understanding certain embodiments of systems and methods disclosed herein, it is important to appreciate the technologies and data that may be associated with network communications. The following foundational information may be viewed as a basis from which the present disclosure may be properly explained.

Typically, architectures that facilitate network communications generally rely upon three basic components: a data-plane, a control-plane, and a management-plane. The data-plane carries user traffic, while the control-plane and the management-plane serve the data-plane. As referred to herein in this Specification, the term 'plane' can refer to a separation of traffic that can traverse a network. As referred to herein in this Specification, the terms 'user-plane', 'data-plane' and 'user data-plane' can be used interchangeably.

Generally, a service chain is defined as a mechanism by which packets, as part of a packet flow, are steered through an ordered set of services such that egress from one service function corresponds to ingress of a next service function. A service-chain-number and a service-index number are typically used to identify a service chain. Both numbers can be used to identify service-functions hosted on a given service chain. Also, typically a service chain controller, such as a Virtual Network Function-Manager (VNFM), which may be part of a Software Defined Network (SDN) controller, manages the service chains.

Several forms of service chaining exist in current deployments including, but not limited to, cloud-infrastructure provided service chaining, data-center provided service chaining and/or hardware-based service chaining technologies for cloud-/data-center and/or more traditional infrastructures. Modern service chaining and Software Defined Network (SDN) solutions can include complete model-driven service chaining and service function deployments to enable malleable service composition with virtualized and/or physical services. As referred to herein in this Specification, the terms 'service chain' 'service function chain' (SFC) and can be used interchangeably.

Cloud- and/or data-center solutions may provide a service chaining and SDN solution (e.g., by way of emerging OpenStack solutions). Standards Development Organizations (SDOs) such as the European Telecommunications Standards Institute (EISI) Network Function Virtualization (NFV) Industry Specification Group are standardizing orchestration and management procedures for service composition with cloud- and data-center infrastructures.

As referred to herein in this Specification, the terms 'virtualized network function' and 'virtual machine' can encompass an emulation of a computer system and/or computing platform operating based on the computer architecture and functions of a real or hypothetical computer, with particular embodiments involving specialized hardware, software, or a combination of both. In various embodiments, a service function, virtual network function (VNF), a virtual machine (VM), a virtual network function component (VNFC), a VNFC instance (VNFCI), a virtualized deployment unit (VDU), virtualized functionality and/or any virtualized network controller (e.g., a VNFM), gateway, module, aggregator, combinations thereof or the like as described herein can be instantiated for operation via a hypervisor-based virtualization or a container-based virtualization of a server (e.g., blade server, rack server, stand-alone server) using the server's hardware (e.g., processor(s), memory element(s), etc.) and/or operating system for a given VNF/SDN architecture. As referred to herein in this Specification, virtualized services can include services deployed as containers, virtual machines and/or operating system processes.

Scaling service capacity for gateway functions in NFV/SDN-based systems is a difficult problem. Capacity of a service can be measured as supported number of subscribers or bandwidth, for example. A gateway function can be defined as a collection of one or more gateway VNFCIs, chained by a service chain, which can collectively implement functionality of a traditional 'gateway' or, more generally, service. In various embodiments, a traditional 'gateway' or service can perform 3rd Generation Partnership Project (3GPP) Mobile Packet Core (MPC) functions, Deep Packet Inspection (DPI) engines, Network Address and/or Port Translation (NA(P)T) functions, optimizers (e.g., web, video, audio, Transmission Control Protocol (TCP), etc.), firewall functions (e.g., Uniform Resource Locator (URL) blocking functions), combinations thereof or any other function that might be performed in a Mobile Packet Core Network and/or Gi-Local Area Network (Gi-LAN) environment. Typically in current deployments, to scale service capacity, a VNFM receives one or more 'load' measurements from VNFCIs it manages, and then, based on these measurements, determines whether to scale up or down the capacity of one more VNFs by spawning additional or discarding superfluous VNFCIs. Since VNFMs manage many different kinds of VNFs, each with their own VNFCIs, the VNFM usually only makes scaling decisions on an abstract definition of busyness/load of individual VNFCIs.

Current solutions for scaling VNF-based gateways are unsatisfactory. For example, 'load' is typically based on measuring CPU load and memory usage (e.g., basic measurements), for example, drawn from within a VNFCI or observed externally by querying the hypervisor where the VNFCI executes, which does not adequately inform the VNFM about the end-to-end service delivery of the gateway service. The same applies to application-specific VNFCI load measurements obtained from within the VNFCI. The problem of these basic- or application-specific measurements is that they are mostly meaningless for gateway functions. Instead, what really matters is throughput of a service, end-to-end service delay and packet-loss rates of the service. Throughput, end-to-end service delay and packet-loss of a service or services can represent parameters known as a service's Key Performance Indicators (KPIs). Service KPIs are largely ignored by VNFM scaling mechanisms implemented in current deployments.

Thus, while NFV systems provide a mechanism to scale service capacity of individual services via VNFM, current techniques used by such VNFMs are largely inadequate for virtualized gateway infrastructures by considering only CPU capacity and memory usage or application-specific load for scaling the capacity of such gateway functions rather than scaling based on end-to-end service KPIs.

In accordance with at least one embodiment, these shortcomings (and others) can be overcome by a communication system 10, as shown in FIG. 1A, which can provide a system and methods to facilitate managing chained services in a network environment by scaling capacity for chained services using measurement information obtained as a measurement packet traverses a given service chain. Referring to FIG. 1A, FIG. 1A is simplified block diagram illustrating a communication system 10, which can include physical and/or virtualized resources that may be deployed in cloud-computing and/or data-center environments to facilitate managing chained services in a network environment. In at least one embodiment, communication system 10 can be associated with a 3GPP architecture such as a Long Term Evolution (LTE) architecture, which can include an Evolved Packet Core (EPC), sometimes referred to as a mobile packet core (MPC). In various embodiments, communication system 10 can be associated with other 3GPP or non-3GPP architectures.

Communication system 10 can include users operating user equipment (UE) 20, a service provider network 25, an Internet and/or Enterprise network(s) 40, a mobile service infrastructure 50, a collector element 100, a service assurance system 102, and a Virtual Network Function-Manager (VNFM) 104. In one embodiment, Service Chain Verification (SCV) logic 90 can be included in VNFM. Referring to FIG. 1B, FIG. 1B is a simplified block diagram illustrating am example service chain flow 120, which can be forwarded across a number of chained services and is discussed herein in conjunction with FIG. 1A. It should be understood that there are typically many thousands of subscribers whose traffic can be handled by the mobile service infrastructure. Only one subscriber associated with UE 20 is shown as an example for FIG. 1 for illustrative purposes only and is not meant to limit the broad scope of the present disclosure. Any number of UE can be present in communication system 10 in accordance with various embodiments described herein.

In various embodiments, mobile service infrastructure 50 can be implemented via a compute node having hardware and software resources, which can be abstracted into one or more logical layers. In various embodiments, a compute node can include, but not be limited to: a data center compute node such as a server, rack of servers, multiple racks of servers, etc. for a data center; a cloud compute node, which can be distributed across one or more data centers; combinations thereof or the like.

Mobile service infrastructure 50 can include three logical layers: an SDN layer 30, a service layer 31 and a classifier and/or load balancing layer 32. Classifying and/or load balancing functionality can be referred to collectively using the term 'classifier/load balancer' and variations thereof. SDN layer 30 can include a number of Virtual Forwarding Nodes (VFNs) that can be used to chain one or more VNFCIs or, more generally, virtual machines, into one or more service chains of services instantiated within the service layer 31 in order to provide flow steering functionality for packets traversing service chains. As referred to herein in this Specification, a forwarding node can also be referred to more generally as a forwarder, a forwarding function or a flow steering node or function. SDN layer 30 can include a classifier VFN (VFN-CL) 60 and one or more steering VFNs (VFN-STs) such as a first VFN-ST(1) 70, a second VFN-ST(2) 71 and a third VFN-ST(3) 72.

Generally during operation, the classifier/load balancing layer 32 can enforce policies and/or charging for policy and/or charging information obtained from one or more policy and/or charging server(s) and can bridge or 'translate' those polices to the SDN layer 30 for steering traffic across service chains. In various embodiments, the service layer 31 can provide services associated with mobile packet core data-plane and/or Gi-LAN services and the SDN layer 30 can implement service chains (e.g., when combined with services in the service layer 31).

In various embodiments, packet forwarding nodes can be special purpose forwarding nodes and/or standard compute nodes that can support different configurations and/or combinations of classifying, load balancing, forwarding, and/or computing functionality. Thus, although separate forwarding functions are illustrated for VFN-CL and VFN-ST(1)-(3), it should be understood that a forwarding node can be configured to provide both FORW-CL and FORW-ST functionality for one or more FORW-CL instances and/or one or more FORW-ST instances instantiated for SDN layer 30.

There are many possible methods to implement service chaining. In at least one embodiment, service chaining provided by communication system 10 can be assumed to be based on Internet Engineering Task Force (IETF) Service Function Chain (SFC) communication standards and/or protocols carrying Network Service Header (NSH) encapsulated IP packets with metadata and service path information and provide tunneling for service chains. It should be understood that IETF SFC NSH service chaining is only an example tunneling protocol that can be provided via mobile service infrastructure 50. Other tunneling protocols can be equally provided via mobile service infrastructure 50 in accordance with various embodiments.

Classifier/load balancing layer 32 can include a Virtual Classification Node (VCN) 61. The VFN-CL 60 can interface with VCN 61. VCN 61 can interface with one or more policy and/or charging (policy/charging) server(s) to gather policy and/or charging information for one or more subscribers/UE associated with the subscribers. In some embodiments, a VCN Agent (VCN-A) 62 can be configured for communication system 10, in which VFN-CL 60 can interface with VCN-A 62, which can then interface with VCN 61 via a control interface 63. VCN-A 62 can be a logical extension of VCN 61 that can aid in service chain programming. As noted, VCN 61 can interface with one or more policy and/or charging server(s) (e.g., one or more Policy and Charging Rules Functions (PCRFs), one or more Online Charging System (OCSs), one or more Offline Charging Systems (OfCSs), etc.) and, in some embodiments, can operate to push policy information and/or charging information to the VFN-CL 60.

In various embodiments, control interface 63 can be an interface which complies with one or more control and configuration protocols including, but not limited to, OpenFlow™, General Packet Radio Service (GPRS) Tunneling Protocol (GTP) control-plane (GTP-C) and/or the Netconf/Yang (NC/Y) standard. Otherwise, in embodiments in which no VCN-A 62 is configured, then VCN 61 can interface with VFN-CL 60. In various embodiments, The VFN-CL 60 can communicate with the optional VCN-A 62 and/or VCN 61 using a communication channel, which can be based on Internet IETF SFC NSH service chaining communication standards and/or protocols. In various embodiments, any of a VCN 61, a VCN-A 62 and/or a forwarding function can be instantiated as VNFCI.

The VFN-STs can be configured to manage and route packets over one or more service chains including a number of services, which can be configured via a number of VNFCs, instantiated as a number of service functions (e.g., VMs, VNFs, VNFCIs) within the service layer 31 such as a first VNFCI(1) 80, a second VNFCI(2) 81, a third VNFCI(3) 82 and a fourth VNFCI(4) 83. Packets can be routed one-by-one across the services of a service chain to perform one or more operations on the packets.

In various embodiments, services provided on a service chain can include, but not be limited to, gateway functions such as, for example, Mobile Packet Core services (e.g., user data-plane Serving Gateway (SGW-U) services, user data-plane Packet Data Network (PDN) Gateway (PGW-U) services), which potentially be decomposed into any number of services that may be provided by a SGW-U and/or PGW-U, DPI engines, NA(P)T functions, web-optimizers, TCP optimizers, URL blocking functions, Gi-LAN functions such as, for example, protecting Radio Access Networks (RANs) and other system or subscriber assets against denial-of-service attacks, protocol- or application-level service delivery (e.g., mobile/cellular TCP optimizations, video optimization, etc.), policing of incoming or outgoing flows (e.g., firewalling, rate control) and/or providing for additional application-specific charging functionality (e.g., based on Hypertext Transfer Protocol (HTTP) and/or Secure HTTP (HTTP/S) level functions), combinations thereof or the like.

An SGW or SGW-U service function is a data-plane element that can provide functionality for managing user mobility and interfaces with RAN nodes (e.g., eNodeBs, NodeBs, Home eNodeBs (HeNBs), Home NodeBs (HNBs)). An SGW or SGW-U service function can also maintain data paths between RAN nodes and PGW(s) or PGW-U(s). A PGW or PGW-U service function typically provides IP connectivity access network (IP-CAN) session connectivity for UEs to external packet data networks (PDNs) (e.g., Internet and/or enterprise network(s) 40). In some embodiments, a Serving GPRS Support Node (SGSN) service function can be implemented to provide access for legacy Universal Mobile Telecommunication System (UMTS) network devices. For example, UE in a UMTS Terrestrial Radio Access Network (UTRAN) or Global System for Mobile Communications (GSM) Enhanced Data Rates for GSM (EDGE) Radio Access Network (GERAN) can communicate through an SGSN to an SGW/SGW-U service function or a PGW/PGW-U service function, which can include or be configured with functionality for a Gateway GPRS Support Node (GGSN) service function to support communication with legacy systems.

Although only four VNFCIs are shown for the embodiment of FIG. 1A, it should be understood that any number of VNFCs and VNFCIs can be configured for communication system 10. Further, a VFN-ST can be configured to interface with one or more VNFCIs in accordance with various embodiments of communication system 10. In one embodiment, for example, first VFN-ST(1) 70 can interface with first and second VNFCIs(1)-(2) 80-81, second VFN-ST(2) 71 can be configured to interface with third VNFCI(3) 71 and third VFN-ST(3) 72 can be configured to interface with fourth VNFCI(4) 83.

VFN-CL 60 can be configured with an ingress interface 51 and one or more VFN-ST(s) can be configured with an egress interface, such as, for example, a first egress(1) interface 52 configured for first VFN-ST(1) 70 and a second egress(2) interface 53 configured for third VFN-ST(3) 72. In at least one embodiment, ingress interface 51 can be configured to provide ingress Virtual Routing Forwarding (VRF) abstraction and interfacing for incoming traffic to enable VFN-CL 60 to interface with VCN 61 and/or VCN-A 62, if configured, in order to classify traffic to a particular service chain or service chain instantiation. In another embodiment, an ingress interface may be an attachment circuit, for example, as defined in IETF Request For Comments (RFC) 4364 pointing to a VRF. In at least one embodiment, ingress interface 51, first egress(1) interface 52 and second egress(2) interface 53 can be logical elements of one or more Ethernet controllers and/or drivers (e.g., Network Interface Card(s))

Any flow steering node can be configured to provide egress processing via a corresponding egress interface, which can be configured to: 1) only steer forward path traffic from SDN layer 30 towards the Internet and/or enterprise network(s) 40; 2) only steer reverse path traffic from the Internet and/or enterprise network(s) 40 towards an access attachment circuit such as service provider network 25 and/or a Radio Access Network (RAN) for delivery to a subscriber/UE; or 3) to provide forward path and reverse path egress processing in accordance with various embodiments. For example, first egress(1) interface 52 for first VFN-ST(1) 70, which can represent a flow steering function for one or more services in at least one embodiment, can provide egress processing for both forward and reverse path traffic. In various embodiments, egress processing can include selecting an appropriate egress attachment circuit (e.g., virtual Local Area Network (vLAN), tunnel, etc.).

VFN-CL 60 can be in communication with one or more VFN-STs(1)-(3) and can forward classified packets for traffic into corresponding service function chains or service function chain instantiations. As shown in the embodiment of FIG. 1A, VFN-CL 60 is in communication with first VFN-ST(1) 70, which is in communication with VNFCI(1) 80 and VNFCI(2) 81. VFN-ST(1) 70 can interface with VNFCI(1) 80 and VNFCI(2) 81 via 'N' communication channel(s) depending on the number of service functions, gateways or the like, virtual or physical, instantiated or deployed for service layer 31. In one embodiment, the communication channels can be based on IETF SFC NSH service chaining communication standards and/or protocols. It should be understood that VFN-CL 60 can be in communication with any of VFN-ST(1)-VFN-ST(3) or any other flow steering node that may be configured/instantiated in mobile service infrastructure 50 in order to forward packets into various SFCs.

For the embodiment shown in FIG. 1A, first VFN-ST(1) 70 can also configured with first egress(1) interface 52, which can provide for interfacing with Internet/enterprise network(s) 40. First VFN-ST(1) 70 can further be in communication with second VFN-ST(2) 71, which can be in communication with third VNFCI(3) 82. For the embodiment shown in FIG. 1A, it is assumed that second VFN-ST (2) 71 is not configured with an egress interface but rather is configured to communicate with third VFN-ST(3) 72. Third VFN-ST(3) 72 is in communication with fourth VNFCI(4) and is further configured with second egress(2) interface 53, which can provide for interfacing with Internet/enterprise network(s) 40. VFN-ST(2) 71 can communicate with VNFCI(3) 82 via 'N' communication channel(s), which can be based on IETF SFC NSH service chaining communication standards and/or protocols. VFN-ST(3) 72 can communicate with VNFCI(4) 83 via 'N' communication channels, which can also be based on IETF SFC NSH service chaining communication standards and/or protocols.

In at least one embodiment, each VNFCI(1)-(4) 80-83 can interface with collector element 100 and collector element 100 can interface with service assurance system 102. Service assurance system 102 can further interface with VNFM 104. VNFM 104 can further interface with each VFN-ST(1)-(3) 70-72 in order to manage service functions (e.g., VNFCIs) for service chains, as discussed in further detail herein. In some embodiments, VNFM 104 can be configured with collector element 100.

Although VNFCIs are illustrated in the embodiment of mobile service infrastructure 50, Physical Network Functions (PNFs) can also be deployed in mobile service infrastructure 50 in various embodiments. VMs, VNFs, VNFCIs and/or PNFs can be supported through virtual machines, containers and/or other virtualized deployment configurations. Thus, in various embodiments, as discussed herein, service functions can be virtual or virtualized service functions (e.g., software running in a data center) and/or separate physical nodes (e.g., hardware) performing service function operations; thus, use of the terms 'virtual' or 'virtualized' in describing various elements, nodes, devices, etc. shown in the FIGURES described herein is not meant to be limit the broad scope of the present disclosure. In some embodiments, VNFCIs can be configured to interface with one or more policy and/or charging server(s).

Each of the computing devices, elements, nodes and/or systems discussed for various embodiments described herein can couple to one another through simple interfaces (as illustrated) or through any other suitable connection (wired or wireless), which provides a viable pathway for network communications. Additionally, any one or more of these computing devices, elements, nodes and/or systems may be combined or removed from a given deployment based on particular configuration needs. Communications in a network environment are referred to herein as 'messages', 'messaging' and/or 'signaling', which may be inclusive of communications using packets.

As discussed herein in this Specification, a packet is a formatted unit of data that can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 10 can represent a series of points or nodes of interconnected communication paths (wired or wireless) for receiving and transmitting packets of information that propagate through communication system 10. In various embodiments, communication system 10 can be associated with and/or provided by a single network operator or service provider and/or multiple network operators or service providers. In various embodiments, communication system 10 can include and/or overlap with, in whole or in part, one or more packet data networks, such as, for example, internet and/or enterprise network(s) 40. Communication system 10 may offer communicative interfaces between various computing devices, elements, nodes and/or systems and may be any local area network (LAN), wireless local area network (WLAN), metropolitan area network (MAN), wide area network (WAN), virtual private network (VPN), Radio Access Network (RAN), virtual local area network (vLAN), enterprise network, Intranet, extranet, or any other appropriate architecture or system that facilitates communications in a network environment.

In various embodiments, communication system 10 may implement user datagram protocol/Internet Protocol (UDP/IP) connections and/or transmission control protocol/IP (TCP/IP) communication language protocol in particular embodiments of the present disclosure. However, communication system 10 can alternatively implement any other suitable communication protocol, interface and/or standard, proprietary and/or non-proprietary, for transmitting and receiving messages. Other protocols, interfaces and/or communication standards that can be used in communication system 10 can include 3GPP Diameter-based protocols, Remote Authentication Dial-In User Service (RADIUS) protocols, AAA signaling, terminal access controller access-control system (TACACS), TACACS+, Proxy Mobile IP version 6 (PMIPv6), Proxy Mobile IP version 4 (PMIPv4), Extensible Messaging and Presence Protocol (XMPP), GTP (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol, Simple Object Access Protocol (SOAP), SOAP over Hypertext Transfer Protocol (HTTP), Representational State Transfer (REST), combinations thereof or the like.

To address scaling of gateway functions hosted on service chains, a parallel can first be drawn between such a gateway service and a generic queuing system. In a queuing system, on one or more parallel servers process incoming independent requests, one at a time, with a certain processing time from an input queue of requests. Generally, if it is assumed that the processing time is relatively constant over a large body of service requests, then the length of the input queue and the individual processing time of the request can be used to determine the end-to-end delay for an individual service request as it goes through a given service by way of Little's theorem. In general, a service request can be a set of incoming packets depending on a given service itself. For example, a firewall service performing Network Address Translation (NAT) could consider a single packet to be a service request while an Application-Level Gateway (ALG) function for the firewall service may take several packets to perform an action (modeled as a service request here). Little's theorem can be applied to service request such that the long-term average number of service requests in a stable system is equal to the long-term average effective arrival rate of service requests multiplied by the average processing time spent performing operations for a service request.

The service through a singular gateway function hosted on a service chain can be mapped directly as a trivial server of type M/D/1 or G/D/1 depending whether arriving traffic is Poisson or Long Range Dependent (LRD) as can be the case for TCP traffic. The terms 'M/D/1' and 'G/D/1' refer to types of queues or statistical abstractions of queues in which 'M' and 'G' refer to interarrival times of packets into a queue, 'D' refers to the service time in the queue (which is deterministic in the case of service requests) and the '1' represents the number of service for the queue (e.g., just one VNFCI).

One caveat to mapping a service chain to a given queue type is that for real gateway functions and service chaining solutions, the amount of buffering is often fixed and packet loss is directly related to the length of that queue. When an input queue grows too long, newly arriving requests are simply discarded. In other words: both KPIs, end-to-end delay and packet loss, directly determine the performance of an individual gateway hosted on a service chain.

While queuing theory can be used to model individual services, such modeling can also be applied to multiple services in a service chain and modeled as a distributed gateway service. If KPIs can be drawn from each of the services in a given service chain independently, each of the service nodes should be assessed independently. Using KPIs for scaling services in the chain should then be applied to a service in the chain that is creating a bottleneck in the chain. Measurements from other services in the same service chain cannot be considered independent measurements. Bottleneck services or, more general, servers, can be characterized as those services with the longest queues, having the most packet drops and/or having longest delays for a given service chain.

When gateway services or distributed gateway services are shared over multiple service chains, a constellation of the service chain infrastructure can be considered as a Directed Acyclic Graph (DAG) instead of a chain, with multiple ingress and egress points. When such sharing occurs, mapping queuing delay through shared service chains onto an appropriate abstract service to determine whether a bottleneck exists becomes more complex. As before with sequential services, scaling service capacity should only take the bottleneck service into consideration.

In accordance with one embodiment, queuing modeling can be used as a basis for building a system, such as communication system 10, where elasticity of service capacity of gateway functions, operating as VNFs with their VNFCIs, potentially chained into longer service chains, can be managed using on-line measurements of end-to-end packet transfer delay and packet drop rates. More specifically, during operation communication system 10 can provide a system and method through which ingress packet flows can be tagged, potentially at random, as test or measurement flows. When packets of such measurement flows traverse the SDN layer 30 for a given service chain, the forwarding nodes (e.g., VFN-STs) can record KPIs (e.g., measurement information) for those packets and flows. In various embodiments, VNFM 104 can configure VFN-CL 60 to tag packets at random or according to a periodic rate.

Separately, the KPIs can be collected via collector element 100 for further disentanglement, which can, in certain embodiments, include an analysis of queuing delay through a service chain DAG for the given service chain to determine whether a service for the service chain is creating a bottleneck.

One key difficulty to resolve for each of a number of service chains that may be present within mobile service infrastructure is to identify whether a bottleneck service is present within a given service chain. In accordance with at least one embodiment, collector element 100 can identify whether a bottleneck service is present for a given service chain or, in some embodiments, can identify whether a service and/or service chain is underutilized.

As noted, a bottleneck service can be a service that measures the longest queues, packet drops and/or delays for a particular service chain. Once identified, scaling decisions can be made via service assurance system 102 on the queuing delay of packets as these traverse this bottleneck service. To detect the steady state in a queue, the input arrival process ideally behaves as a Poisson process. Unfortunately, any traffic experiencing LRD, such as TCP traffic, does not behave as a Poisson process and Random Early Detection (RED) may be needed to combat this LRD.

Based, at least in part, on queuing delay, service assurance system 102 can determine whether to scale up or down the service capacity of a distributed gateway function as implemented by the service chaining solution and can send VNFM 104 a scale up or scale down notification for one or more service function(s) and/or service chain(s) for which capacity needs to be adjusted. In various embodiments, capacity can be scaled up when end-to-end latency and/or packet drop rates of a bottleneck service starts to deteriorate; yet, when there is no packet loss and a service experiences consistent low latency end-to-end service delay, capacity can be scaled down.

In one embodiment, selection of packet flows for statistics collection and analysis can be based on tagging packet flows in a manner whereby statistical inferences can be drawn on end-to-end performance and packet drop rates. In some embodiments, scaling up service capacity can include instantiating additional instances of the bottleneck service to maintain such instances of the service in parallel with the bottleneck service. In still some embodiments, scaling up service capacity can include instantiating completely new service chains to run in parallel with the service chain including the bottleneck service. New SPIs can be generated for new services and/or service chains instantiated to scale up capacity. In still some embodiments, scaling up service capacity can include instantiating a completely new DAG having services that form service chains as are present for the service chains experiencing deteriorated performance due to the bottleneck service.

While the present disclosure addresses enabling the ability to scale up or scale down capacity, different techniques relating to how measured results can be interpreted in order to provide scaling is not outside its broad and expansive scope. It is anticipated that this disclosure would indeed be applicable to determining different techniques, thresholds (e.g., queue length thresholds, delay thresholds, packet drop thresholds, etc.) combinations thereof or the like, which could be used to trigger when capacity scaling operations are performed for a given communication system in order to provide a stable dynamic system.

During operation, in various embodiments, steering of traffic across service chains can be provided using one or more service headers such as, for example, an IETF SFC NSH, or can carried elsewhere for one or more packets. An IETF SFC NSH is a shim header that is interposed between an outer, overlay, header and an inner, subscriber data, header. An IETF SFC NSH, as discussed in further detail herein, is a structure that can include one or more SFC headers that can be used to steer packets through one or more service chain(s) or set(s) of service chain(s). An IETF SFC NSH can carry metadata and service path information to allow an overlay to efficiently enforce a specific sequence of functions (e.g., GW functions, service functions, etc.) desired for certain traffic. In one embodiment, an IETF SFC NSH header can be constructed for incoming traffic by a classifier node (e.g., VCN 61 or a VCN-A 62) for a given service chain as selected for the traffic that: (1) assigns the traffic to one or more particular service chain(s) according to a policy for the traffic, and (2) assigns the traffic to particular service chain path(s) (e.g., a particular instantiation of a service chain) according to a load-balancing decision. The classification can be performed using a first packet received for a subscriber. In various embodiments, a first packet can include a first-sign-of-life (FSOL) packet (e.g., GTP-C packet, GTP user data-plane (GTP-U) packet, IP packet) received for a subscriber. The constructed NSH can be communicated to VFN-CL 60 for use with subsequent packets received for the subscriber. As referred to herein, an IETF SFC NSH can be referred to more generally as a NSH. Thus, in various embodiments, the VCN 61/VCN-A 62 can associate a SPI and NSH to a packet; construct the NSH; inform the VFN-CL 60 of the traffic's classification; offload subsequent classifying functionality to the VFN-CL 60 for subsequent packets received for the traffic; and return the packet including the NSH to the VFN-CL.

In some embodiments, a service chain to which a subscriber's flow has been classified and service chain path can be identified using a two-tuple identifier such that the first value in the two-tuple represents the service chain number for the logical service chain classification and the second value in the two-tuple is a service path identifier (SPI) that identifies the selected service chain path selected for a flow. In some embodiments, the two-tuple can be carried in a NSH for a packet along with other metadata and/or path information for the packet. In other embodiments, the SPI alone can be carried in an NSH for a packet along with other metadata and/or path information for the packet. Other metadata and/or path information related measuring KPI parameters of chained services is described in further detail below.

During operation, a first incoming packet for a particular flow for a particular subscriber (e.g., a subscriber associated with UE 20) is received at ingress interface 51 and is classified by VFN-CL 60 via VCN 61 (and/or VCN-A 62, if configured). Ingress traffic can include IP traffic, S1 user-plane (S1-U) traffic, S5-U traffic, S8-U, combinations thereof or the like. Once classified the first incoming packet and any subsequent packets for the flow can be inserted into service chains identified by their SPI. Consider, for example, packets for service chain flow 120 as shown in FIG. 1B, which can be inserted into an example service chain composed of VFNCI(1) 80 and VNFCI(3) 82. It should be understood that the example service chain illustrated in FIG. 1B is provided for the present operational example represents only one service chain out of a multitude of service chains that may potentially be configured and instantiated for a communication system in accordance with the broad scope of the teachings of the embodiments described in the present disclosure.

In accordance with at least one embodiment, effectiveness of service functions hosted on service chains can be measured by tagging, potentially at random, flows hosted on the service chains as measurement flows by the VFN-CL 60. Flows that can be tagged as measurement flows can carry subscriber traffic. Such a measurement flow carrying subscriber traffic can be used to draw a sample for the end-to-end delay of the flow through an entire service chain operating on the flow. In one embodiment, when VFN-STs along a service chain (e.g., VNFCI(1) 80 and VNFCI(3) 82 for the service chain operating on service chain flow 120) identify such a measurement flow, they can record measurement information including a sequence of time stamps and can send the measurement information for the measurement flow to collector element 100. Collector element 100 can then correlate all measurement information for the service chain measurements to prepare an end-to-end measurement for the entire chain with all the services attached to it. Moreover, if a packet is dropped, collector element 100 can correlate the measurement results such that packet drops can be detected. For example, if measurement information includes packets in and out of a given service, the 'out' and 'in' of consecutive services should match (assuming no packet reordering). For some services, in and out should also match; thus, packet drops can be detected based on measurement results from services and/or consecutive services.

In one embodiment, the VFN-CL 60 can be configured with selector logic that functions to select flows, potentially at random, for KPI measurements. In one embodiment, the VFN-STs(1)-(3) 70-72 can be configured with sampler logic. As packets for measurement flows traverse a given service chain, VFN-ST sampler logic for each particular VFN-ST for a given service chain can function to collect individual measurement information for each particular VFN-ST. The sampler logic for each VFN-ST can upload the measurement information to collector element 100, which can aggregate the measurements to prepare a total end-to-end measurement for the given service chain. In one embodiment, collector element 100 can be modeled on the IPfix/Netflow toolset. In such an embodiment, the same message formats can be used between the sampler logic and collector element 100. VFN-CL 60 can tag any subsequent packets for any previously selected measurement flows to continue to perform measurements on such flows.

In one embodiment, selector logic can enable the already defined NSH Operational, Administration and Management (OAM) bit in the NSH base header for statistics collection. When set in the NSH base header for a given packet, the bit can be used to indicate to all VFN-STs in a given service chain to treat the packet as a combined measurement and data packet. Whenever a VFN-ST receives a packet for a given VNF where the packet has the NSH OAM bit set, the VFN-ST records the various time stamps associated with the packet and the VNF.

In various embodiments, one or more time stamps that can be included in measurement information recorded by sampler logic configured for a given VFN-ST can include, but not be limited to: the time when a packet is received by first read by an Ethernet controller and/or driver (e.g., was received at an ingress interface) or was received by a given VFN-ST; the time when a packet is placed on an output queue and sent towards the service function associated with the VFN-ST; the time when the packet is received from the service function and made available to a next service function (e.g., either for another VFN-ST or a same VFN-ST); and/or the time when the packet is added to an output queue maintained by the Ethernet controller and/or driver (e.g., added to the output queue of an egress interface).

Collector element 100 combines all measurement information for a given service chain (e.g., essentially samples) into an end-to-end measurement for the service chain. For example, in one embodiment, collector element 100 can identify measurement information for a service chain using a SPI included with the measurement information received from VFN-CL 60, each of a VFN-ST for a given service chain and the VFN-ST associated with the egress interface of the service chain and can determine end-to-end measurement information for the service chain.

For each service chain, which can be identified by an SPI, collector element 100 can, in various embodiments, record long-term and/or short-term averages for end-to-end delay, the individual service delay of VNFCIs anchored on the service chains, the packet loss rates at each of the nodes and/or the total number of packets as seen for each of the service chains. The total number of packets as seen for each of the service chains is important to enable an attribution of load to specific service chains. The collector element 100 can make such aggregate service chain information available to a scaling service, analytics engines or any other operational system, which can be configured for service assurance system 102, more generally referred to as a 'service assurance layer'. The aggregate service chain information can be made available to the service assurance system 102 via a load notification provided for each of one or more service chains supported by mobile service infrastructure. In various embodiments, load notifications can be triggered at one or more configured time interval(s), at low watermark threshold(s) and/or at high watermark threshold(s).

In various embodiments, collector element 100 can be synchronized pair-wise with each VFN-ST(1)-(3) 70-72 or collector element 100 and each VFN-ST can be synchronized to a common clock to ensure measurement information consistency across multiple service chains and/or service paths.

Thus, service assurance system 102 can respond to a load notification from the collector element 100 by scaling up or down services for service chains. To scale service chains, service assurance system 102 can, in various embodiments, interact with VNFM 104 to signal the VNFM to increase/decrease service capacity of individual services, or service assurance system 102 may determine to increase/decrease the capacity of a whole set of VNFCIs in case the services are chained in a service chain.

In addition to scaling up services for service chains, service assurance system 102 may, in some embodiments, determine that a service and/or service chain is underutilized. In such embodiments, service assurance system 102 can send a scale down notification to the VNFM 104 to: remove or cancel one or more services from one or more service chains; to cancel one or more service chains entirely to scale down capacity of such services and/or service chains; and/or to relocate one or more underutilized services to another service chain. By removing or canceling a service or service chain, it is meant that the service or service chain is taken off-line and its resources, infrastructure, etc. freed-up for consumption of other services and/or service chains that may be instantiated. It should be noted that when service capacity is reduced, care should be to be taken to drain the impacted services and/or service chains of their (potentially long-lived) flows before services and/or chains are removed from commission.

To measure the service delay through a service node, it is important for a given VFN-ST to correlate ingress and egress traffic as it is sends packets towards a VNFCI and receives packets back from the VNFCI. Ingress and egress traffic between a VFN-ST and a VNFCI relates to traffic routed to a VNFCI (ingress traffic to the VNFCI) and traffic received back from the VNFCI (egress traffic from the VNFCI).

For services (e.g., VNFCIs) that are configured to support NSH packets (typically through an NSH agent or client configured for a VFN-ST and VNFCI), tracking ingress and egress traffic can straightforward. In one embodiment, a flow key that can uniquely identify a given flow, regardless of whether a given service function changes a packet header for a packet of the flow, can be used to map ingress onto egress flows. It can be more difficult when non-transparent and/or non-NSH agent services need to be supported (e.g., a NA(P)T function). In embodiments in which non-transparent and/or non-NSH agent services are used, hashing can be used to hash a first block of data in data fields of packet to enable ingress to egress mapping.

Finally, for terminating services (e.g., caches) without an NSH agent, it is important to: (a) understand that requests that succeed in the cache terminate in the cache; and (b) cache fill requests need to be mapped onto the cache request. To address terminating service request calls, care should be taken to treat a caching service as a terminating service of a service chain rather than treating cache hits as packet-drop events. In some embodiments, mapping cache fill requests onto cache requests can be provided for NA(P)T functions in a similar manner as described above using hashing.

Hashing can provide a mechanism to identify the contents of a packet in a shortened form (e.g., if two hashes match, then the contents of a packet should match as well). In the case of terminating services, hashing can be used to match a same packet after a NA(P)T function has changed the header of the packet rather than using the header values to identify the packet. Use of such hashing assumes that the first packet in a data request (e.g., first data in the flow) will be the same for a cache request and cache fill request since the first part of a HTTP request should be the same (e.g., it should request the same data).

Referring again to VNFM 104, while collector element 100 may provide load notifications to service assurance system 102 in order to trigger scaling up or down capacity, in some embodiments, Service Chain Verification (SCV) logic 90 can be configured for VNFM 104 to provide functionality for determining whether any packets for any service chains may not be handled correctly (e.g., may have missed a service on a service chain, etc.). Via SCV logic 90, VNFM 104 can manage services and/or service chains instantiated for mobile service infrastructure 50 to ensure that all packets for a given flow traverse the appropriate services of the service chains to which the flow has been classified. If a packet does not traverse all expected services for a given service chain, VNFM 104 via SCV logic 90 can query service assurance system 102 to gather measurement statistics for the service chain and/or any other service chains that may share one or more services with the service chain. In some instance, service chain verification can be referred to as proof of transit.

As a subscriber's packet traverses the services of the service chain to which it has been classified each service can: read from in-band metadata included in a header (e.g., an NSH) encapsulated with the packet, process the information in combination with configuration information to update the in-band metadata, and write the updated in-band metadata back to the header for the packet. At the end of the service chain, a verifier, which in some embodiments could be the egress interface for the service chain, can perform a check on the in-band metadata using the configuration information (e.g., the secret associated to the particular rendered path) to determine whether the packet has traversed all appropriate services for the service chain. If the packet has not traversed all its appropriate services, then SCV logic 90 can cause VNFM 104 to query service assurance system 102 to gather measurement information for services on the service chain from collector element 100. Although NSH-based service chaining is discussed for various embodiments herein, the system and method described herein can be implemented for other service chaining technologies including: Segment Routing as defined in IETF draft-ietf-spring-segment-routing-09, Jul. 4, 2016; Virtual eXtensible Local Area Network, Generic Protocol Extension (VXLAN-GPE), native IPv6 (via extension header) and/or IPv4.

In various embodiments, configuration information used in proof of transit verification can include, but not be limited to, security configuration information such as a secret or piece of a secret for use in an embodiment in which a secret sharing method is used to provide proof of transit for a service chain or a cryptographic key for use in an embodiment that implements cryptographic operations to provide proof of transit for a service chain. In various embodiments, a secret sharing method can include, Shamir's Secret Sharing Scheme (SSSS) in which a single (complete) secret may be associated with a given set of services associated with a service chain (e.g., an SPI). In some embodiments, different shares or pieces of the single secret can be distributed to each of the services. Each service can use their respective share to generate a piece or portion of verification information derived from packet specific information or to update the in-band metadata for the packet. A verifier that could, in some embodiments, be associated with the egress interface of the service chain can retrieve the information from the packet and compare it to the complete secret, which can be used to verify the correctness of the in-band metadata (e.g., the verification information) for the packet. In various embodiments, cryptographic operations can include, but not be limited to: block cipher encryption (e.g., using the Advanced Encryption Standard (AES)), keyed-hash message authentication (HMAC), combinations thereof or the like.

In some embodiments, a verifier and the service chain that needs to be verified can be in different trust domains such that the verifier is independent and decoupled from service chain operation itself. For example, in one embodiment, SCV logic 90 can perform proof of transit verification for a given service chain.

In some embodiments, rather than VFN-CL 60 randomly tagging packets for a flow, VNFM 104 can identify a flow to VFN-CL 60 for which packets should begin to be tagged or which should be tagged at a particular rate in order to collect measurement information for the flow. In various embodiments, a flow can be identified by an ingress attachment circuit identifier and/or a GTP-U Tunnel Endpoint Identifier (TEID) in combination with an embedded 5-tuple flow mask that identifies a source-IP address, a destination-IP address, a source-port, a destination-port and a transport protocol for a packet. A 5-tuple flow mask in combination with a GTP-U TEID is referred to as a 6-tuple and a 5-tuple in combination with an ingress attachment circuit identifier and a GTP-U TEID is referred to as a 7-tuple flow mask. VFN-CL 60 can also use a flow mask to identify subsequent packets for a flow following classification of a first packet of the flow by VCN 61 and/or VCN-A 62, if configured.

In some embodiments, VNFM 104 may query the status of a service on a service chain to determine whether the service has failed, in which case another instantiation of the service can be spun-up and inserted for the service chain. In some embodiments, measurement information for a service may indicate that it is over-utilized, in which case VNFM 104 can scale up capacity for the service chain based on a scale up notification received from service assurance system 102 using techniques as described for various embodiments discussed herein.

Accordingly, communication system 10 can, in various embodiments, provide a system and method to manage service chains and associated service capacity elasticity through correlation of IPfix/Netflow flow records for cloud-based and/or virtualized deployments. While cloud-based and/or virtualized solutions typically scale on CPU load, memory consumption and/or application-specific parameters, communication system 10 provides solutions in which (a) a bottleneck service can be determined by analyzing IPfix/Netflow records (e.g., time stamps contained in measurement information received from VNFCIs) and (b) capacity of a service chaining solution can be scaled up or down based, at least in part, on such measurement information. When considered jointly with service rates, end-to-end service management as provided by communication system 10 can form an integral part of the service assurance of a deployment.

In various embodiments, IPfix/Netflow records (e.g., measurement information) can be used as the base ingredients to scale up and down service capacity in an NFV-based (distributed) gateway system hosted on a SDN-based forwarding system. The records can be used to statistically determine end-to-end delays and packet loss rates through (NSH-based) service chains. Service assurance system 102 can then use the measurements to scale capacity to demand in this system. In some embodiments, communication system 10 can be treated as a dynamic system with continuous measurements and reactions to such measurements. However, in other embodiments, communication system 10 can be configured to guarantee the stability of the system using, for example, service chain verification techniques.

Thus, communication system 10 can provide advantages in various embodiments such that using actual end-to-end delay measurements, packet drop rates, and/or other similar KPIs can provide service providers offering distributed gateway services and their customers with meaningful measurement to scale an NFV-based system. Measuring service capacity in a gateway system by CPU load, memory usage, or even application-specific measurements oftentimes does not provide insight in the actual end-to-end delay and packet drop rates. However, taking end-to-end service delivery, packet-loss rate, and/or other similar KPIs into account can be used to provide efficient management through scaling of service capacity for a (distributed) gateway service and/or service chains.

As discussed herein, mobile service infrastructure 50 can, in some embodiments, support user-plane functions for architectures having split control and user-plane functionality. Typically, various control functions for a 3GPP LTE network having a separated Control/User plane mobile packet core can include control-plane related elements or nodes such as, for example, a Mobility Management entity (MME), a segregated control-plane SGW (SGW-C), a segregated control-plane PGW (PGW-C) and/or a segregate control-plane SAE GW (SAEGW-C) controller (once defined), and can include policy related elements or nodes such as, for example, Authentication, Authorization and Accounting (AAA) elements, PCRFs, OCSs and/or OfCSs. Typically, the data-plane and services functions associated thereto can include all data-plane and service related functions, which can include, but not limited to, standard IP routing, IETF SFC NSH service chain handling for mobile packet core and Gi-LAN services, GTP packet processing, and/or providing value-added services typically supported in Gi-LAN service areas.

In various embodiments, mobile service infrastructure 50 can support control-plane functions that may use service chain functions for routing and steering control-plane messages (e.g., GTP-C and DIAMETER) under control of at least one VCN 61 and/or at least one VCN-A 62 to support 3GPP network slicing. By separating control-plane and data-plane functions for a mobile packet core, the data-plane can be optimized and scaled independently of the control-plane, which can improve resource usage in the network resulting in a better user experience at a lower cost compared to a system where control- and data-plane functionality grow in an approximately simultaneous manner. In various embodiments, control-plane functions of a mobile packet core can be collocated with other policy, profile and charging elements. In a virtualized deployment including control and/or data-plane service functions, mobile service infrastructure 50 can enable advantages of scaling and flexibility that virtualization can provide.

Although only one ingress interface (e.g., ingress interface 52) is shown in FIGS. 1A-1B, it should be understood that there can be more than one ingress network that can providing connectivity to different access networks. Further, additional egress networks can be provided. For example, in various embodiments, different access point names (APNs), Multi-Operator Core Networks (MOCNs), network slicing, Dedicated Core (DECOR), etc. can be configured in communication system 10.

In general, service provider network 25 may provide a communications interface between UE 20 and mobile service infrastructure 50 for one or more 3GPP and/or non-3GPP Radio Access Networks (RANs). In various embodiments, 3GPP access networks can include GERAN, UTRAN, generally referred to as 3rd Generation (3G), and/or a LTE access network such as Evolved-UTRAN (E-UTRAN), generally referred to as 4th Generation (4G), LTE/LTE-Advanced (LTE-A) and/or 5th Generation (5G). In various embodiments, non-3GPP access networks can include wireless local area networks (WLANs), such as Institute of Electrical and Electronic Engineers (IEEE) 802.11 Wi-Fi networks, HotSpot networks, etc., Worldwide Interoperability for Microwave Access (WiMAX) networks, Bluetooth™ networks, combinations thereof or the like.

In various embodiments, service provider network 25 can also include one or more control and/or control-plane elements (e.g., for virtualized architectures) such as for example, functionality (physical and/or virtual) one or more MME(s). In various embodiments, an MME can provide for UE tracking and paging procedures including, for example, retransmissions, tracking area list management, idle mode UE tracking, etc. An MME can further provide for UE bearer procedures including activation, deactivation and modification, SGW/SGW-U and PGW/PGW-U selection for UE and authentication services.

In various embodiments, VNFM 104 may include functionality to provide for management operations for VFNs (e.g., CL and ST), VNFs, VNFCIs or the like. In various embodiments, management operations can include, but not be limited to, instantiation, updating, scaling and/or termination of sets of VNF(s) and/or VNFCI(s). In various embodiments, VNFM 104 can also include Virtual Infrastructure Manager (VIM) functionality to provide for resource management operations of compute storage network resources for a Network Function Virtualization Infrastructure (NFVI). An NFVI is not explicitly shown for communication system 10 but is instead described with reference to SDN layer 30 and service layer 31 and the elements provided therein. In various embodiments, resource management operations can include, but not be limited to, allocating and maintaining an inventory of software, computing, storage and/or network resources, which may be dedicated to an NFVI.

NFVI typically includes hardware and/or software resources, a virtualization layer and virtualized resources (e.g., SDN layer 30 and service layer 31). NFVI can be used to couple respective VNF(s) and VNFCI(s) to underlying hardware resources to provide for their execution. Typically, NFVI can provide interconnectivity and infrastructure for interfacing each VNF/VNFCI instantiation with virtual resources, which can be abstracted from hardware resources.

In some embodiments, software resources can include hypervisors, which can be implemented as virtual machines (VMs) in a suitable server or other computing platform. In some embodiments, software resources can include containers, which can be implemented within an operating system or kernel in a suitable server or other computing platform.

In some embodiments, resource management operations can further include the allocation of virtualization enablers, such as for example, allocating VMs onto hypervisors or allocating containers within operating systems or kernels, compute resources, storage and/or network elements which may provide for network connectivity. In still some embodiments, resource management operations can further include managing resources to hypervisor-based or container-based virtualizations and/or resource reclamation. In still some embodiments, resource management operations can include providing for visibility into and/or management of NFVI resources, root cause analysis of performance issues and/or problems with NFVI resources, collection of fault information and/or collection of information for capacity planning, monitoring and/or optimization of one or more dynamic mobile service infrastructure 50 realizations.

In various embodiments, virtual resources can include virtual computing, virtual storage and virtual network resources. In various embodiments, hardware resources may include computing hardware, storage hardware and network hardware. SDN layer 30 can be used to abstract hardware resources into virtual resources to configure service functions (e.g., VNFs, VNFCIs, VMs, etc.) for service layer 31.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 20 can be associated with any users, subscribers, employees, clients, customers, electronic devices, etc. wishing to initiate a flow in communication system 10 via some network. In at least one embodiment, UE 20 is configured to facilitate simultaneous Wi-Fi connectivity and cellular connectivity within communication system 10. The terms 'user equipment', 'mobile node', 'mobile station' or 'mobile device' are inclusive of devices used to initiate a communication, such as a computer, an electronic device such as a parking meter, vending machine, appliance, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 10. UE 20 may also be inclusive of a suitable interface to a human user such as a microphone, a display, a keyboard, or other terminal equipment.

UE 20 may also be any device that seeks to initiate a communication on behalf of another entity or element such as a program, a database, or any other component, device, element, or object capable of initiating an exchange within communication system 10. In certain embodiments, UE 20 may have a bundled subscription for network access and application services (e.g., voice), etc. In one embodiment, once the access session is established, the user can register for application services as well, without additional authentication requirements. Within communication system 10, IP addresses (e.g., for UE or any other element in communication system 10) can be assigned using dynamic host configuration protocol (DHCP), Stateless Address Autoconfiguration (SLAAC), during default bearer activation processes, etc., or any suitable variation thereof. IP addresses used within communication system 10 can include IP version 4 (IPv4) and/or IP version 6 (IPv6) IP addresses.

While discussions provided herein are described in connection with mobile networks, this is not meant to limit the broad scope of the present disclosure. In various embodiments, mobile service infrastructure 50 can be applied to any tunnel-terminated and service chain based deployments, and/or can be applied to wireless or wireline networks.

Figure 2A:
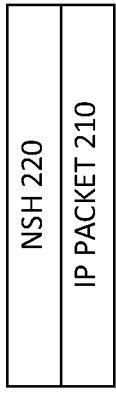
FIGS. 2A-2F are simplified schematic diagrams illustrating example details that can be associated with Network Service Header encapsulation of an example packet in accordance with one potential embodiment of the present disclosure.

Referring to FIGS. 2A-2F, FIGS. 2A-2F are simplified schematic diagrams illustrating example details that can be associated with NSH encapsulation of an example IP packet in accordance with one potential embodiment of the present disclosure. As shown in FIG. 2A, an encapsulated packet 200 can be created by encapsulating a subscriber's IP packet 210 together with an NSH 220. The encapsulated packet can be forwarded through a given service chain (e.g., to which the subscriber's flow has been classified) path using metadata, information, etc. that can be read-from and/or writtento NSH 220 as the subscriber's IP packet 210 traverses a given service chain. The subscriber's IP packet 210 can be considered the payload for the encapsulated packet 200. However, it should be understood that IP packet 210 can include one or more headers, which can carry flow mask information such as, for example, a source-IP address, a destination-IP address, a source-port, a destination-port and a transport protocol for the IP packet 210.

Figure 2B:
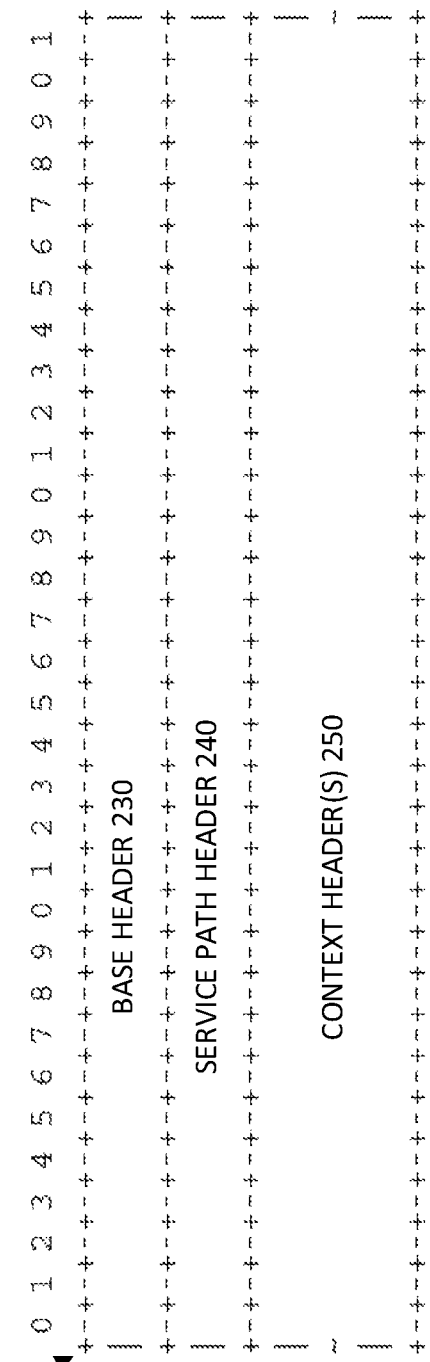

Referring to FIG. 2B, FIG. 2B is a simplified schematic diagram illustrating example details that can be associated with NSH 220 in accordance with one potential embodiment. NSH 220 can include a 4-byte base header 230, a 4-byte service path header 240 and one or more context header(s) 950, which can be of variable length.

Figure 2C:
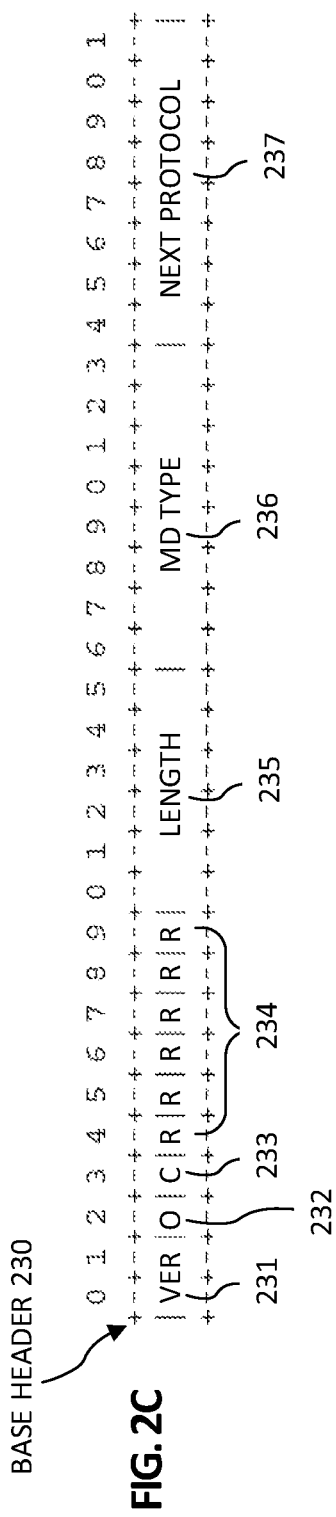

Referring to FIG. 2C, FIG. 2C is a simplified schematic diagram illustrating example details that can be associated with base header 230 in accordance with one potential embodiment. In various embodiments, base header 230 can provide information about the NSH 220 and the payload protocol. The base header 230 can include a version (VER) field 231, an operations and management (OAM) bit (O) 232, a critical metadata bit (C) 233, a reserved (R) bit field 234, a length (LENGTH) field 235, a metadata type (MD TYPE) field 236 and a next protocol (NEXT PROTOCOL) field 237.

In at least one embodiment, VER field 231, O bit 232, C bit 233, R bit field 934, LENGTH field 235, MD TYPE field 236 and NEXT PROTOCOL field 917 can be defined according to IETF standards. For example, when MD TYPE is set to a Type 1, the NSH 220 is to carry four, four-byte context headers immediately following the service path header 240. When MD Type is set to a Type 2, zero or more context headers of variable length can be, but are not required to be, added to the NSH 220 following the service path header. In accordance with at least one embodiment, O bit 232 can be set during operation (e.g., via VFN-CL 60) to indicate that a packet has been tagged as a measurement packet such that each VFN-ST through which the packet passes is to perform measurements on the packet.

Figure 2D:
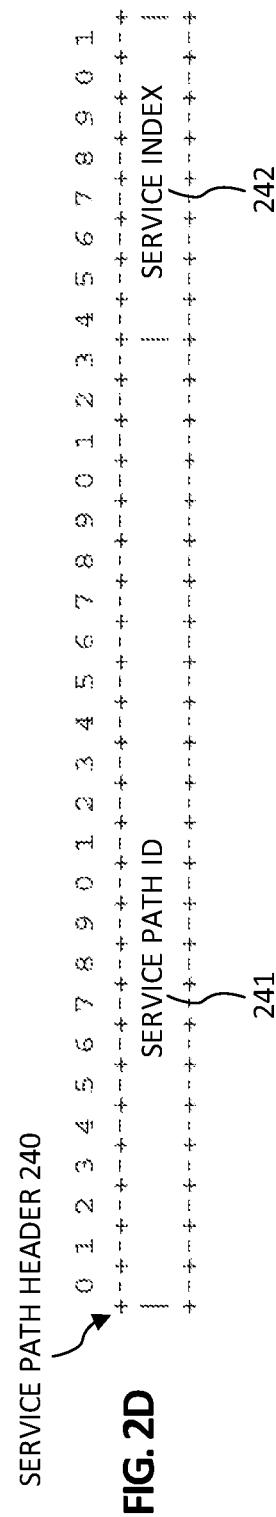

Referring to FIG. 2D, FIG. 2D is a simplified schematic diagram illustrating example details that can be associated with service path header 240 in accordance with various embodiments. In various embodiments, service path header 240 can include a 24-bit service path ID (SPI) field 241 and an 8-bit service index field 242. The SPI field 241 identifies the SPI for the packet and the service index field 242 indicates the location of the packet within the service path. As a packet traverses a service chain, the service index is decremented.

Figure 2E:
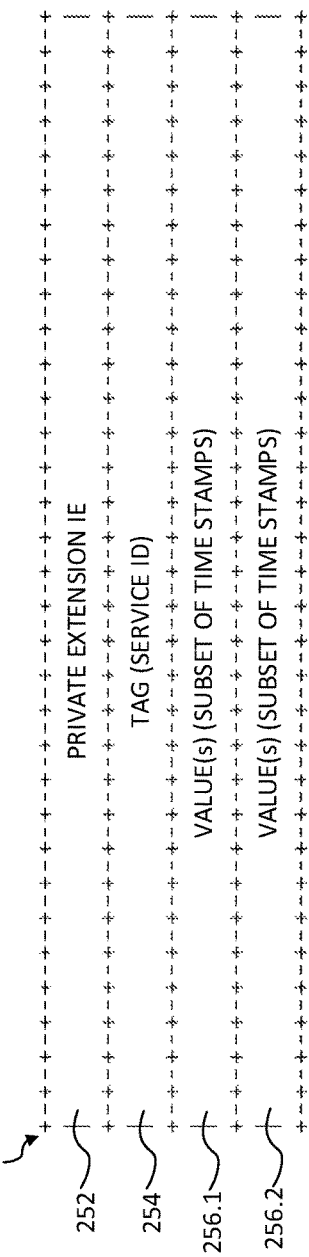
Figure 2F:
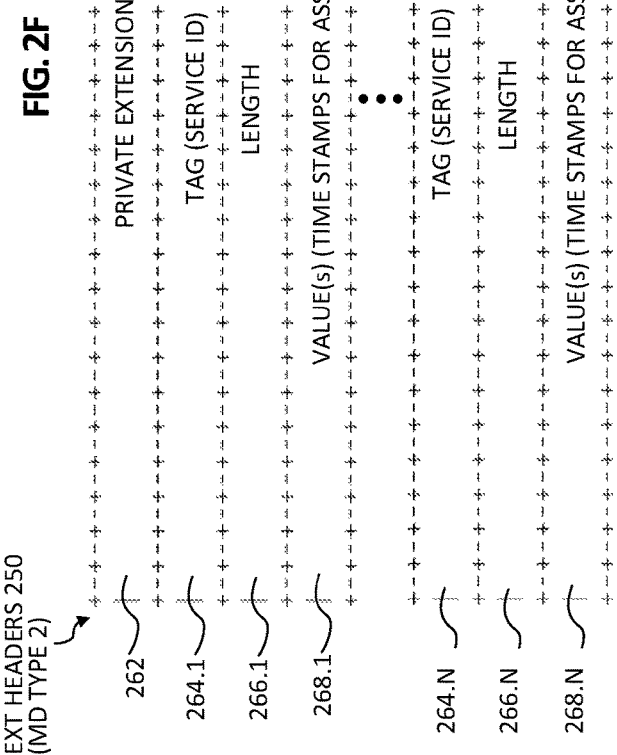

Referring to FIGS. 2E-2F, FIGS. 2E-2F are simplified schematic diagrams illustrating example details that can be associated with one or more context header(s) 250 in accordance with various potential embodiments. In various embodiments, context header(s) 250 can include metadata and/or variable length encoded information that may be consumed or otherwise used by one or more service(s) of a given service chain. In some embodiments, the information can be encoded in a Tag, Length, Value (TLV) format or a Tag, Value format. The Tag field can represent the type of the additional information and/or parameters contained in context header(s), the Length field can indicate the size of data associated with the Tag field and the Value field can contain an associated value (e.g., a time stamp). For headers of a fixed size (e.g., MD Type 1, a Length header may be omitted. In some embodiments, metadata carried in one or more context header(s) 250 can include configuration information, which can be used in proof of transit verification, such as security configuration information (e.g., a secret, a piece of a secret, a cryptographic key), verification information (e.g., portion of verification information derived at a given service and passed from the service to a subsequent service), combinations thereof or the like.

The embodiment shown in FIG. 2E illustrates example context header 250 formatting for MD Type 1 having a fixed size of four, four-byte context headers including: a private extension Information Element (IE) header 252, a Tag header 254, a first Value header 256.1 and a second Value header 256.2. In one embodiment, the private extension IE header 252 can be set to a private extension value between 32768 and 65535, which can be acquired from the Internet Assigned Numbers Authority (IANA). The value can be used to indicate that the context headers are associated with measurement information for one or more service(s). In one embodiment, Tag header 252 can be set to a service ID and the Value headers 256.1-256.2 can include a subset of time stamps for a given service chain. In one embodiment, for example, the subset of time stamps can include an entry time for a packet entering a first VNFCI of a given service chain; an entry time for the packet entering a previous VNFCI (if not the first) for the service chain; and an exit time for the packet exiting a previous VNFCI. It should be understood that other subsets of time stamps could be configured for the Value headers 256.1-256.2 as desired by a network operator and/or service provider.

Turning to FIG. 2F, FIG. 2F illustrates example context header 250 formatting for MD Type 2 having context headers of a variable length including: a private extension IE header 262 and a set of 'N' TLV headers (264.1-268.1 thru 264.N-268.N) for each of a given service N for a given service chain. Each respective Tag headers (264.1-264.N) can be set to a respective service ID for a service chain. Each respective Length header 266.1-266.N can be set to a respective length value for each respective Value header 268.1-268.N. Each respective Value header 268.1-268.N can include entry and exit time stamps for each respective service (e.g., VNFCI) for the service chain. It should be understood that other time stamp information could be configured for Value headers 268.1-268.N as desired by a network operator and/or service provider.

Figure 3:
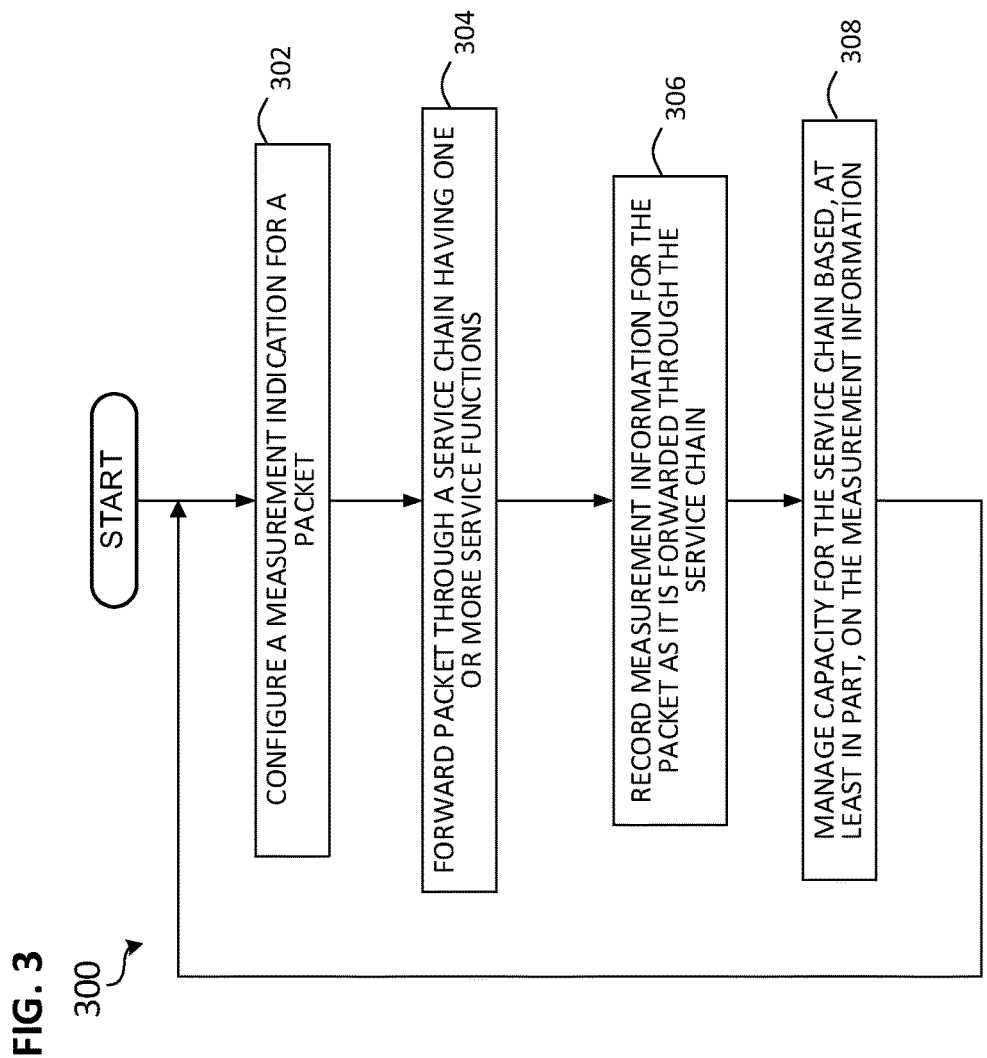
FIG. 3 is a simplified flow diagram illustrating example details that can be associated with example operations to facilitate managing chained services in a network environment in accordance with one potential embodiment.

Referring to FIG. 3, FIG. 3 is a simplified flow diagram illustrating example details that can be associated with example operations 300 that can facilitate managing chained services in a network environment in accordance with one potential embodiment. As discussed for various embodiments described herein, packets for a subscriber's traffic can be tagged as measurement packets at random, at a particular rate or based on some other trigger configured via VNFM 104. Thus, operations can begin at 302 in which a measurement indication is configured for a packet received at a classification and forwarding VFN (e.g., VFN-CL 60) of mobile service infrastructure 50. In at least one embodiment, configuring the measurement indication for a packet can include setting an OAM bit of an NSH for the packet.

At 304, the operations can include forwarding the packet through a service chain having one or more service function(s). For example, any of VFN-ST(1)-(3) 70-72 can be used to forward a packet through a given service chain. At 306, the operations can include recording measurement information for the packet as it is forwarded through each service function of the service chain. For example, any of VFN-ST(1)-(3) 70-72 can record (e.g., store) measurement information for the packet as it is forwarded through the service chain. In some embodiments, the measurement information can be sent to collector element 100. In some embodiments, the measurement information can be sent to collector element 100 using IPfix/Netflow flow records in which the measurement information pertaining to a given service chain can be identified via its SPI. In some embodiments, as discussed herein, measurement information can be forwarded with a packet to a subsequent forwarding node for analysis by the subsequent forwarding node.

At 308, the operations can include managing capacity for the service chain based, at least in part, on the measurement information and the operations can return to 302 in which one or more subsequent packets for the service chain can be tagged. In various embodiments, managing capacity can include scaling up or down instances of service functions and/or service chains, as discussed herein, via interactions between collector element 100, service assurance system 102 and VNFM 104. For example, service assurance system 102 can send scale up and/or scale down notifications to VNFM 104 indicating service function(s) and/or service chain(s) for which capacity needs to be adjusted.

Figure 4:
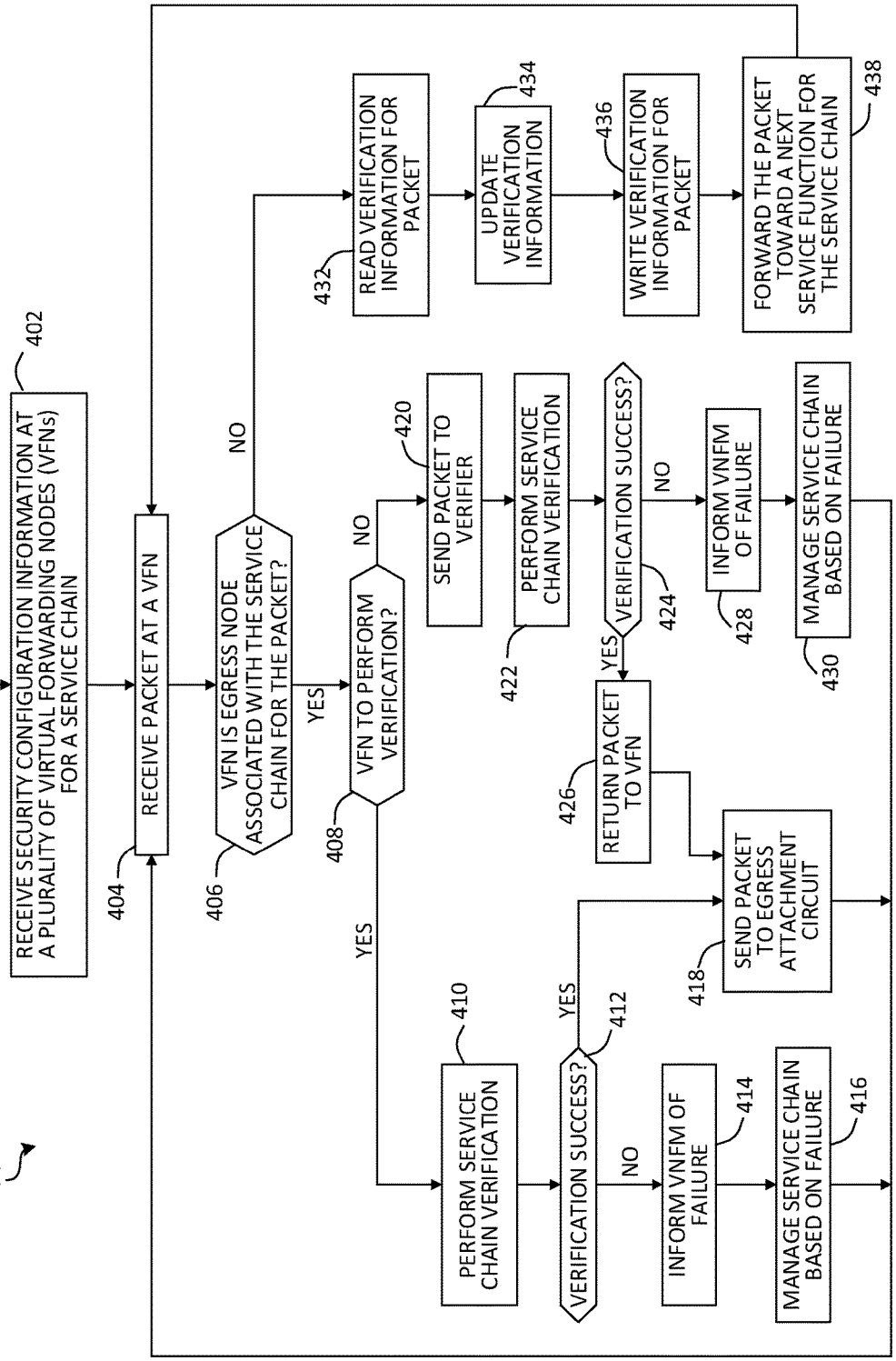
FIG. 4 is a simplified flow diagram illustrating other example details that can be associated with other example operations to facilitate managing chained services in a network environment in accordance with one potential embodiment.

Referring to FIG. 4, FIG. 4 is a simplified flow diagram illustrating other example details that can be associated with other example operations 400 that can facilitate managing chained services in a network environment in accordance with one potential embodiment. In particular, operations 400 can be associated with an embodiment in which proof of transit can be provided in communication system 10 in order to verify whether packets for a subscriber's traffic traverse each service function for a given service chain to which the traffic has been classified. Thus, in one embodiment, operations 400 assume that traffic for a subscriber has previously been classified via VFN-CL 60.

At 402, the operations can include receiving security configuration information at a plurality of VFNs for a service chain. The plurality of VFNs can include, at least in part, a classifier VFN configured with an ingress interface (e.g., VFN-CL 60 configured with ingress interface 51) and a steering VFN associated with an egress interface for the service chain (e.g., VFN-ST(3) configured with second egress(2) interface 53 for the service chain operating on service chain flow 120). One or more additional steering VFNs can receive the security information, depending on the service chain configuration.

At 404, the operations can include receiving a packet for the subscriber's traffic at a VFN (e.g., VFN-CL or VFN-ST). At 406, the VFN can determine whether it is the egress steering node associated with the service chain for the packet. In at least one embodiment, a VFN can be configured with service path information that can aid the VFN in determining whether it is the egress steering node for a given service chain. In at least one embodiment, a VFN can parse the service index of a service path header to determine if it is the last VFN associated with a service chain for a packet. In such an embodiment, the service index would be equal to zero if the VFN were the last VFN associated with a given service chain.

If the VFN is the egress node associated with the service chain for the packet, the operations can continue to 408 in which the VFN can determine whether the VFN is to perform service chain verification operations on the packet or is to send the packet to an external verifier (e.g., SCV logic 90 or another node of communication system 10 configured to perform verification operations). If the VFN is to perform the verification operations, the operations can continue to 410 in which the VFN performs service chain verification on the packet using in-band metadata included with the packet (e.g., verification information) and security configuration information received for the service chain. At 412, the operations can include determining, whether the verification is a success. If the verification is a success, the operations can continue to 418 in which the VFN can send the packet to an egress attachment circuit and the operations can return to 404 and the operations can repeat from 404.

However, if the verification is not a success, the operations can continue to 414 in which the VFN can inform the VNFM 104 of the failure. At 416, VNFM 104, in combination with service assurance system 102 and/or collector element 100 can manage the service chain based on the failure, as discussed for various embodiments described herein and the operations can return to 404 and can be repeated as described herein.

If, at 408, the VFN determines instead that it is not to perform the verification operations, the VFN can send the packet a verifier at 420. In some embodiments, the verifier can be in a different trust domain than the service chain. At 422, the verifier performs verification operations on the packet using in-band metadata included with the packet (e.g., verification information) and security configuration information for the service chain. At 424, the operations can include determining, whether the verification is a success. If the verification is a success, the operations can continue to 426 in which the verifier returns the packet to the VFN. The VFN can send the packet to an egress attachment circuit at 418 and the operations can return to 404 and the operations can repeat from 404. However, if the verification is not a success, the operations can continue to 428 in which the VFN can inform the VNFM 104 of the failure. At 430, VNFM 104, in combination with service assurance system 102 and/or collector element 100 can manage the service chain based on the failure, as discussed for various embodiments described herein and the operations can return to 404 and can be repeated as described herein.

If, at 406, the VFN determines instead that it is not the egress node associated with the service chain for the packet, the operations can continue to 432 in which the VFN reads verification information from the packet. In an embodiment, the verification information can be read from metadata included with the packet. At 434, the VFN updates the verification information. For example, the VFN can update the verification information by operating on the verification information using security configuration information received at the VFN. At 436, the VFN writes the updated verification information back into the metadata for the packet. At 438, the VFN forwards the packet towards a next service function for the service chain and the operations can return to 404 for the operations to repeat. The VFN can decrement the service index before forwarding the packet.

As a VFN can host one or more service functions, forwarding the packet can include forwarding the packet to another VFN or forwarding the packet towards another service function hosted by the VFN; thus, a same VFN can both operate on a packet as a steering function in a service chain and as steering function configured with an egress interface. Therefore, a VFN can both forward and receive a packet for a given service chain in accordance with various embodiments described herein. For example, a service chain could consist of VNFCI(1) 80 followed by VNFCI(2) 81, in which case VFN-ST(1) 70 would control the steering of packets received for the service chain through each VFNCI (1)-(2) as well as control the forwarding the packets toward an egress attachment circuit. Thus, a VFN configured with an egress interface could perform the check at 406 and subsequent operations for either outcome could potentially be possible depending on where processing for a given service chain was for a given packet. For embodiments, in which a VFN-ST is configured to host multiple service functions, the VFN-ST can be configured with each of a respective input queue and a respective output queue for respective each service function hosted thereby. This can enable accurate recording of measurement information for each service function hosted by the VFN-ST.

Stream Reasoning Data Processing

Figure 5:
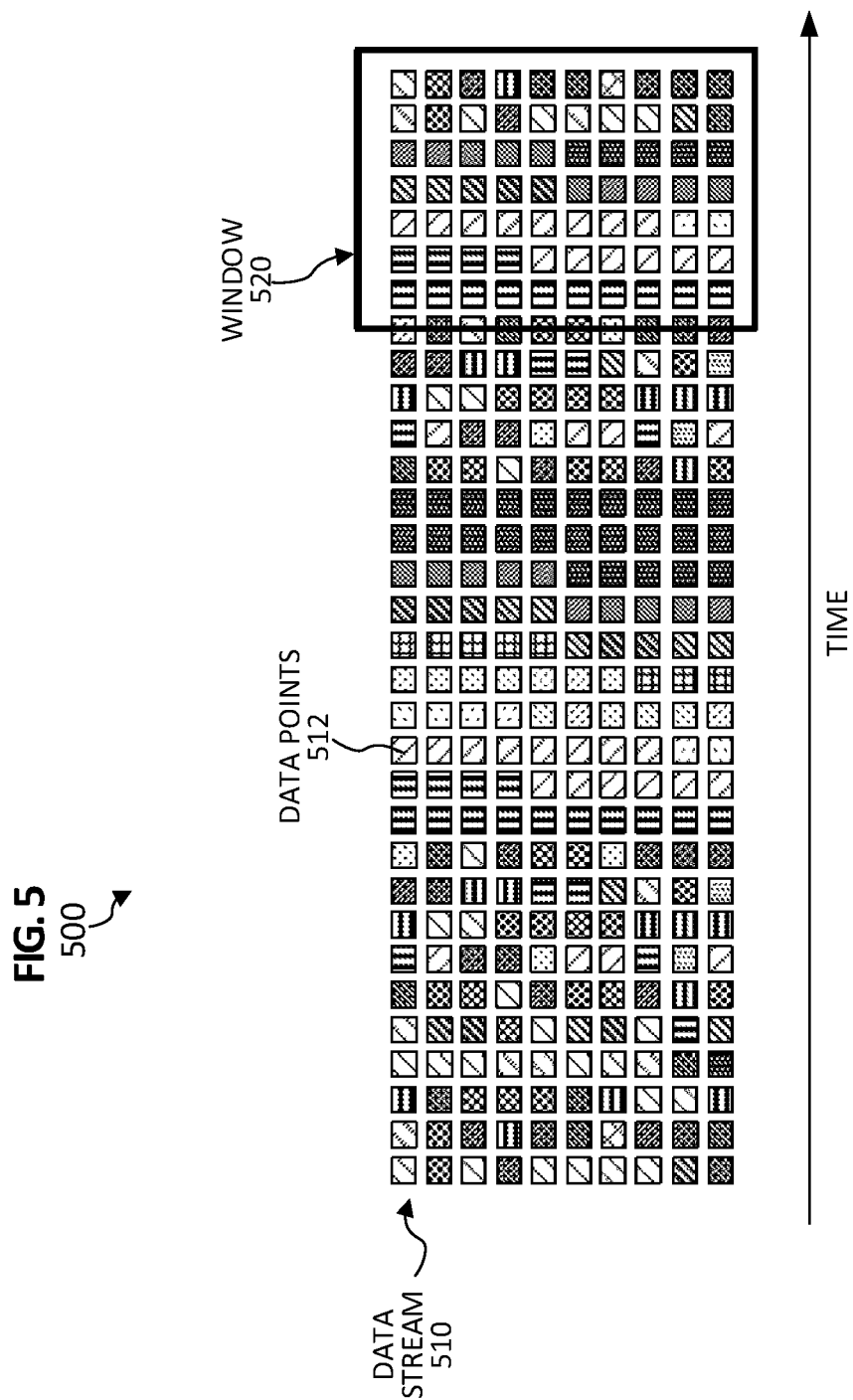
FIG. 5 is a simplified schematic diagram illustrating example details that can be associated with data processing that can be provided in accordance with various potential embodiments of the communication system.

Referring to FIG. 5, FIG. 5 is a simplified schematic diagram 500 illustrating example details that can be associated with stream reasoning data processing that can be provided in accordance with various potential embodiments of communication system 10. It can be envisioned that large amounts of measurement information is likely to be received by collector element 100 for the multitude of service functions, service chains, service chain paths and/or subscriber traffic that may be present for communication system 10. Similarly, it can be envisioned that large amounts of data is likely to be involved in service chain verification operations. In various embodiments, stream reasoning data processing can be configured for communication system 10 in order to help reduce or filter the amount of data processed by collector element 100, service assurance system 102, VFNs and/or VNFM 104.

In one sense, measurement information processed by collector element 100 collected from multiple VFNs (e.g., VFN-CL 60, VFN-ST(1)-(3) 70-72) can be considered a data stream containing unbounded sequences of time-varying data (e.g., time-varying measurement information, end-to-end latency information, etc.). Service chain verification information can similarly be considered as a data stream containing unbounded sequences of time-varying data. To reduce the amount of data processed by an element or node within communication system 10, stream reasoning concepts can be applied to data streams using shallow reasoning processing, which involves analyzing data across a sliding window of a fixed size, to reduce the amount of data that may be processed at a given point in time.

FIG. 5 illustrates a data stream 510 containing a number of data points 512 and a time window 520. In various embodiments, time window 520 can be configured to span a particular range of time (e.g., having a fixed size) and can be shifted according to specified time step size. For example, time window 520 may represent a range of five (5) seconds and can be shifted across data stream 510 in a step size of 1 second. For shallow reasoning processing, a query can be communicated to shallow reasoner logic configured for a given element or node. In various embodiments, a query can include information including, but not limited to, a time window size, step size, event(s), anomaly(s), threshold(s), etc. that are sought to be detected via shallow reasoning processing. In one embodiment, event(s), anomaly(s), threshold(s), etc. can represent trigger information that can be configured for semantic reasoner logic of an element or node. In at least one embodiment queries can be facilitated using Continuous-Simple Protocol and Resource Description Framework (RDF) Query Language (C-SPARQL) protocol queries.

Consider an example use case in which data stream 510 and data points 512 can represent end-to-end latency information processed by collector element 100, which can be configured with shallow reasoner logic to perform shallow reasoning data processing on the data stream. Each row in the data stream can represent latency information for a particular service chain path. The rows of measurement information can be considered trace records across which shallow reasoning operations can be performed using time window 520. During operation, in at least one embodiment, trace records in the specified time window 520 can be selected via the shallow reasoner logic and a running average can be calculated for each of a given flow. The running average can be updated across multiple windows of data. In at least one embodiment, when a trace record's (e.g., service path's) end-to-end latency is greater than 'X' times the running average, then a given query can trigger an action on a match. In one embodiment, the triggered action can include collector element 100 interacting with service assurance system 102, which can interact with VNFM 104 to manage capacity for one or more service function(s) and/or service chain(s).

Figure 6:
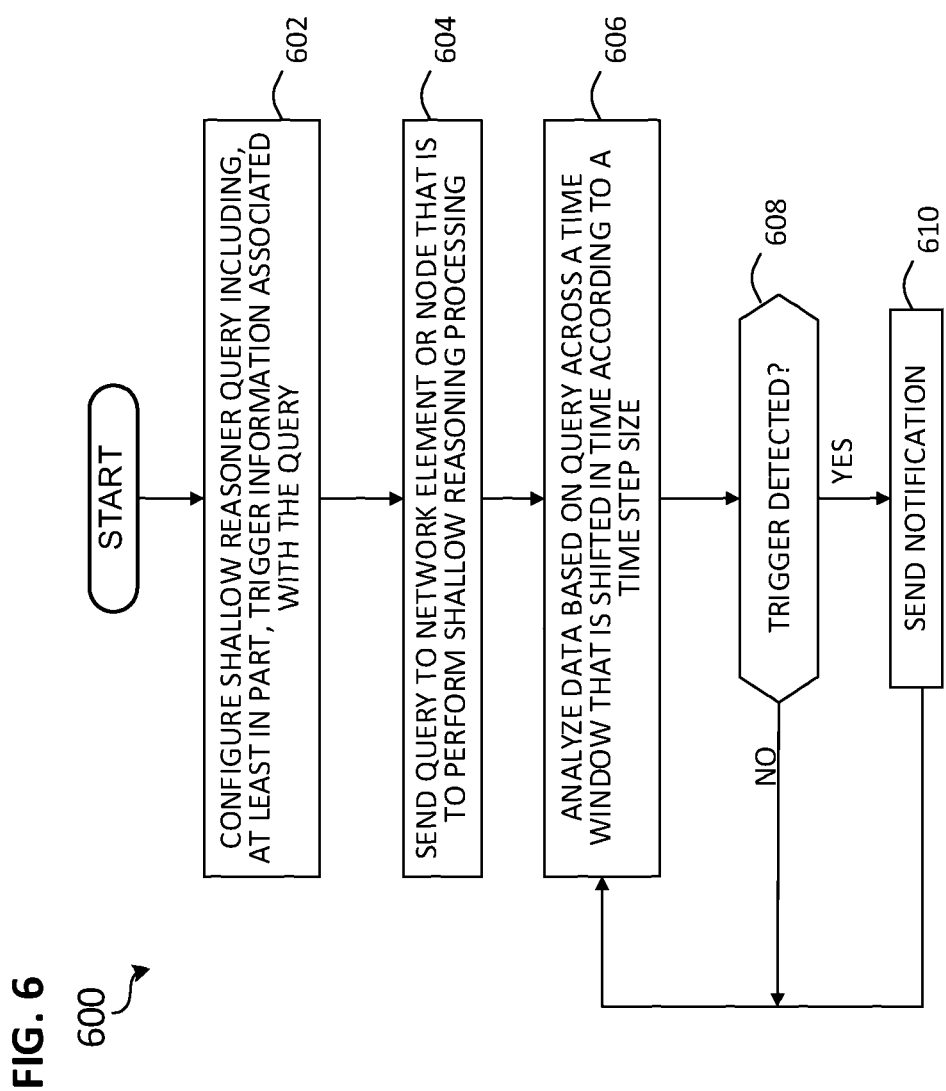
FIG. 6 is a simplified flow diagram illustrating yet other example details that can be associated with yet other example operations to facilitate managing chained services in a network environment in accordance with one potential embodiment.

Referring to FIG. 6, FIG. 6 is a simplified flow diagram illustrating other example details that can be associated with other example operations 600 that can facilitate managing chained services in a network environment in accordance with one potential embodiment. In particular, operations 600 can be associated with an embodiment in which shallow reasoning data processing can be used to reduce or filter the amount of data processed by a given element or node.

The operations can begin at 602 in which a shallow reasoner query is configured that includes, at least in part, trigger information associated with the query. The query can be configured by an element or node for communication system 10. In at least one embodiment, service assurance system 102 can include logic that can operate to configure shallow reasoner queries to be performed on measurement information, analysis at collector element 100, combinations thereof or the like based on policies, Service Level Agreements (SLAs), combinations thereof or the like configured or communicated to service assurance system 102. At 604, the operations can include sending the query to a network element or node that is to perform shallow reasoning processing. At 606, the operations can include analyzing data at the element or node based on the query. The analysis can be performed across a time window that is shifted across a stream of data according to a time step size. At 608, the element or node can determine whether the trigger has been detected.

If the trigger is detected, the operations can continue to 610 in which the element or node sends a notification to the element or node from which the query originated and the operations can return to 606 to further analyze the data. In various embodiments, the notification can be a load notification that includes measurement information, end-to-end analysis, calculations, combinations thereof or the like associated with flow(s) which caused a trigger to be detected so that further analysis, calculations, etc. can be performed in order to manage capacity for one or more service function(s) and/or service chain(s). If the trigger is not detected, the operations can return to 606 to continue analyzing the data without sending the notification. In some cases, a query can be reconfigured at an originating element or node and an updated query can be communicated to the element or node performing the shallow reasoning processing. In such cases, the receiving element or node can update its analysis accordingly.

Figure 7:
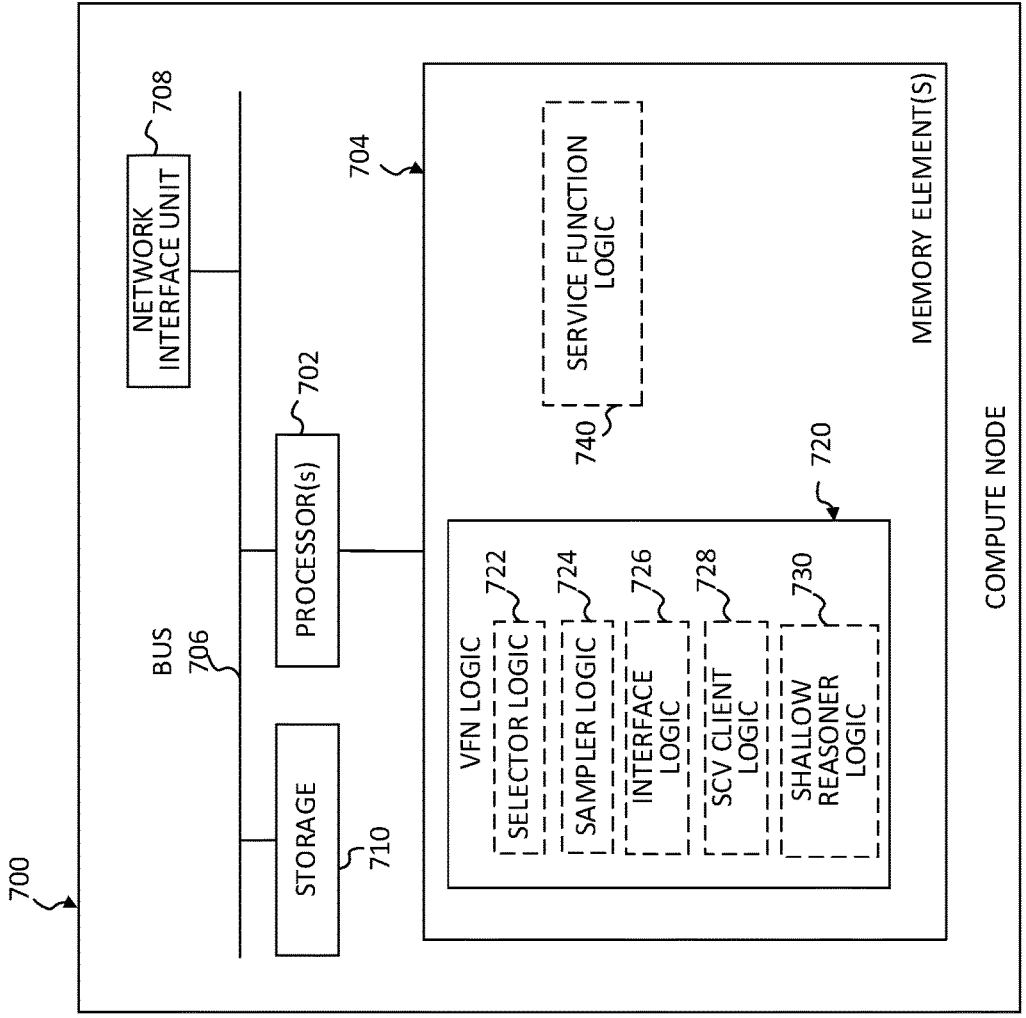
FIGS. 7-10 are simplified block diagrams illustrating example details that can be associated with various potential embodiments of the communication system.

Referring to FIG. 7, FIG. 7 is a simplified block diagram illustrating example details that can be associated with a compute node 700 in accordance with various potential embodiments of communication system 10. The embodiment shown in FIG. 7 illustrates compute node 700, which includes one or more processor(s) 702, one or more memory element(s) 704, a bus 706, a network interface unit 708 and storage 710. Memory element(s) 704 can include instructions for VFN logic 720. In some embodiments, memory element(s) 704 can further include instructions for service function logic 740. In various embodiments, compute node 700 can be implemented: as a data center compute node such as a server, rack of servers, multiple racks of servers, etc. for a data center; as a cloud compute node, which can be distributed across one or more data centers; as combinations thereof or the like.

In various embodiments, one or more compute node(s) 700 can be used to realize mobile service infrastructure 50. In various embodiments, processor(s) 702, memory element(s) 704, bus 706, network interface unit 708, storage 710 and logic, software, etc. configured for compute node 700 can represent hardware, software and network resources, which can be abstracted into an NFVI for mobile service infrastructure 50.

In at least one embodiment, processor(s) 702 is/are at least one hardware processor configured to execute various tasks, operations and/or functions for compute node 700 as described herein according to software and/or instructions configured for compute node 700. In at least one embodiment, memory element(s) 704 is/are configured to store data, information, software and/or instructions associated with compute node 700 and logic configured for memory element(s) 404. In at least one embodiment, bus 706 can be configured as an interface that enables one or more elements of compute node 700 (e.g., network interface unit 708, processor(s) 702, memory element(s) 704 (and logic configured therein), etc. to communicate in order to exchange information and/or data. In at least one embodiment, a fast kernel-hosted interconnect may be employed for compute node 700, potentially using shared memory between processes (e.g., VNFs, service functions, etc.), which can enable efficient communication paths between the processes. In various embodiments, network interface unit 708 enables communication between compute node 700, other compute nodes, collector element 100, VNFM 104, service provider network 25 and/or internet/enterprise network(s) 40 to facilitate operations discussed for various embodiments described herein. In some embodiments, network interface unit 708 can be configured with one or more Ethernet driver(s) and/or controller(s) or other similar network interface driver(s) and/or controller(s) to enable communications for compute node 700 within communication system 10.

In various embodiments storage 710 can be configured to store data, information and/or instructions associated with compute node 700 and/or logic configured for memory element(s) 704. For example, for embodiments in which service chain verification is configured for communication system 10, storage 710 can be configured to store security configuration information such as a secret or piece of a secret and verification information if secret sharing is used to provide proof of transit for a service chain or a cryptographic key if cryptographic operations are used to provide proof of transit for a service chain. Note that in certain examples, certain storage can be consolidated with memory elements (or vice versa), or the storage can overlap/exist in any other suitable manner.

In at least one embodiment, instructions for VFN logic 720 can be configured to provide packet-forwarding functionality to facilitate packet-forwarding (e.g., VFN-ST) for a given service chain. In such an embodiment, instructions for VFN logic 720 can include instructions for sampler logic 724 that, when executed by processor(s) 702, causes compute node 700 to determine whether a measurement indication has been set for a packet to determine whether measurement information should be recorded for the packet.

In one embodiment, the measurement indication can be the OAM bit of an NSH encapsulated with the packet. In such an embodiment, compute node 700 via sampler logic 724 can parse the OAM bit of an NSH base header for each packet received by compute node 700 to determine whether the bit is set and, if so, to record measurement information (e.g., time stamps) associated with the packet. Further, compute node 700 via sampler logic 724 can upload measurement information for one or more packets to collector element 100. In some embodiments, measurement information can be uploaded to collector element on a periodic basis, as configured by a network operator and/or service provider. In some embodiments, collector element 100 can query compute node 700 via sampler logic 724 for measurement information for traffic by identifying a service path identifier associated with the traffic.

In at least one embodiment, instructions for sampler logic 724 can include instructions to perform in-band operations on measurement information included with a packet as it traverses a service chain. For example, in some embodiments, a previous forwarding node in a given service chain (e.g., VFN-ST(1) for service chain flow 120) can include measurement information (e.g., time stamps) in an NSH for a tagged packet. The information can be analyzed by one or more subsequent forwarding nodes (e.g., VFN-ST(3) for service chain flow 120) via instructions configured for sampler logic 724 to determine whether the packet/flow is experiencing upstream performance problems (e.g., reduced throughput, delay, etc.). In one embodiment, if it is determined that a service function for a service chain is causing degraded performance on a subscriber's traffic, then instructions for sampler logic 724 can be configured to communicate corresponding measurement information, calculations and/or analysis for the service chain (e.g., identified via its SPI) to collector element 100, which can send the information to service assurance system 102. Service assurance system 102 can interact with VNFM 104 to determine one or more corrective actions to manage service function(s) for the service chain.

In at least one embodiment, instructions for VFN logic 720 can be configured to provide traffic classification functionality along with packet-forwarding functionality to facilitate traffic classification and forwarding (e.g., VFN-CL) capabilities for compute node 700. In such an embodiment, instructions for VFN logic 720 can include instructions for selector logic 722 that, when executed by processor(s) 702, causes compute node 700 to set a measurement indication for a packet, thereby tagging the packet as a combined measurement and data packet. In some embodiments, the tagging can be random or periodic as configured via VNFM 104. In other embodiments, the tagging of packets for traffic can be initiated by collector element 100 or VNFM 104 in order to gather measurement information for a particular service function or service chain path.

In various embodiments, instructions for VFN logic 720 can be configured to provide ingress interface and/or egress interface packet handling functionality to facilitate receiving traffic from an ingress attachment circuit (e.g., service provider network 25) and/or forwarding traffic to an egress attachment circuit (e.g., internet/enterprise network(s) 40). In such an embodiment, instructions for VFN logic 720 can include instructions for interface logic 726 that, when executed by processor(s) 702, enable compute node 700 to receive incoming traffic from an ingress attachment circuit and/or output traffic to an egress attachment circuit.

In at least one embodiment, instructions for VFN logic 720 can be configured to facilitate proof of transit operations in combination with SCV logic 90 configured for VNFM 104. In such an embodiment, instructions for VFN logic 720 can include instructions for SCV client logic 728 that, when executed by processor(s) 702, enable compute node 700 to interface with SCV logic 90 to receive security configuration information, to operate on in-band metadata to determine the correctness of in-band metadata (e.g., to generate and/or update verification information for a packet), to communicate with a verifier, and/or to communicate with SCV logic 90 regarding the failure of a packet to traverse all services of a given service chain.

In at least one embodiment, instructions for VFN logic 720 can be configured to provide shallow reasoning processing functionality for compute node 700. In such an embodiment, instructions for VFN logic 720 can include instructions for shallow reasoner logic 730 that, when executed by processor(s) 702, causes compute node 700 to perform shallow reasoning operations as described herein. For example, compute node 700 can, in some embodiments as discussed herein, be configured to perform in-band operations on measurement information recorded for a subsequent service function in a service chain and included with a packet. In such embodiments, instructions for shallow reasoner logic 730 can help to reduce the processing load of compute node 700 using the sliding window techniques as discussed herein.

As discussed herein, memory element(s) 704 can, in some embodiments, further include instructions for service function logic 740 that, when executed by processor(s) 702, causes the compute node 700 to perform operations for one or more service functions (e.g., mobile packet core service functions, Gi-LAN service functions, etc.). In some embodiments, a service function can be configured with the ability to classify and/or load balance traffic by updating an outgoing packet carrying an IETF SFC NSH. In some embodiments, this functionality can be used for basic classification and/or load-balancing purposes and/or can be used to dynamically reroute specific packets and/or, if needed, to bypass one or more specific downstream service function(s) in case a flow-offload is not or cannot be used. In at least one embodiment, flow bypass can be used in a case in which a downstream service function does not provide NSH functionality (e.g., is non-NSH-capable). In such a case, an upstream NSH-capable service node can indicate a new path that excludes the non-NSH-capable service node.

Although not shown in the embodiment of FIG. 7, it should be understood that, in various embodiments, a given compute node can be configured with VCN logic or VCN-A logic to perform operations associated with traffic classification and/or load balancing.

Figure 8:
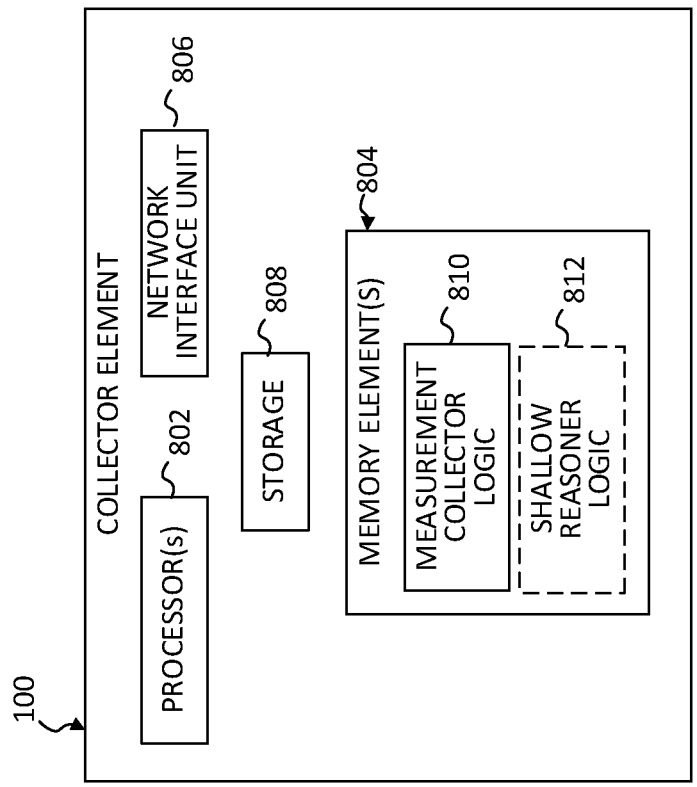

Referring to FIG. 8, FIG. 8 is a simplified block diagram illustrating example details that can be associated with collector element 100 in accordance with various potential embodiments of communication system 10. As shown in the embodiment of FIG. 8, collector element 100 can include one or more processor(s) 802, one or more memory element(s) 804, a network interface unit 806 and storage 808. Memory element(s) 804 can include instructions for measurement collector logic 810. In at least one embodiment, memory element(s) 804 can include instructions for shallow reasoner logic 812. In various embodiments, collector element 100 can be implemented: as a data center compute node such as a server, rack of servers, multiple racks of servers, etc. for a data center; as a cloud compute node, which can be distributed across one or more data centers; as combinations thereof or the like. As discussed herein, collector element 100 can, in various embodiments, be configured to: determine queuing delay for packets as they traverse specific VFNs and service functions; calculate a cumulative end-to-end delay for packet(s) traversing service chain(s), which can include accounting for the delay incurred by a VFN sending a record to the collector element; and determine any networking delay that may exist between two consecutive VFNs in service chain(s). In some embodiments, as discussed in further detail below, collector element 100 can be combined with VNFM 104.

In at least one embodiment, processor(s) 802 is/are at least one hardware processor configured to execute various tasks, operations and/or functions for collector element 100 as described herein according to software and/or instructions configured for collector element 100. In at least one embodiment, memory element(s) 804 is/are configured to store data, information, software and/or instructions associated with collector element 100 and logic configured for memory element(s) 804. In some embodiments, collector element 100 can include a bus (not shown) as discussed herein. In various embodiments, network interface unit 806 enables communication between collector element 100, compute nodes (e.g., VFNs/VFN logic), service assurance system 102 and/or VNFM 104 to facilitate operations discussed for various embodiments described herein. In some embodiments, network interface unit 806 can be configured with one or more Ethernet driver(s) and/or controller(s) or other similar network interface driver(s) and/or controller(s) to enable communications for collector element 100 within communication system 10. In various embodiments storage 808 can be configured to store data, information and/or instructions associated with collector element 100 and/or logic configured for memory element(s) 804.

In at least one embodiment, instructions for measurement collector logic 810 can include instructions that, when executed by processor(s) 802, causes collector element 100 to interact with VFN-CL 60 and VFN-ST(1)-(3) 70-72 to collect measurement information for one or more service functions and/or service chains. The measurement collector logic 810 can, in some embodiments, include instructions that, when executed by processor(s) 802, enables collector element 100 to receive the measurement information passively. In some embodiments, measurement collector logic 810 can include instructions that, when executed by processor(s) 802, enable collector element 100 to query one or more VFN(s) to gather measurement information based on one or more triggers (e.g., receiving an indication that a packet has missed one or more service function(s) of a service chain, determining that one or more service function(s) of a service chain are dropping packets, etc.).

In at least one embodiment, measurement collector logic 810 can include instructions that cause collector element 100 to aggregate measurement information from multiple VFNs in order to calculate end-to-end measurements, statistics and/or analysis for one or more service chains including, but not limited to: delay, packet drop rates, throughput, combinations thereof or the like as discussed for various embodiments as described herein. Measurement collector logic 810 can further include instructions that cause collector element to interact with service assurance system 102 to provide aggregated and/or end-to-end measurement information, statistics and/or analysis to service assurance system 102.

In at least one embodiment, memory element(s) 804 can include instructions for shallow reasoner logic 812 that, when executed by processor(s) 802, causes collector element 100 to perform shallow reasoning operations on measurement information received from one or more VFNs and/or on end-to-end measurement information or other information calculated via collector element 100 as described herein.

Figure 9:
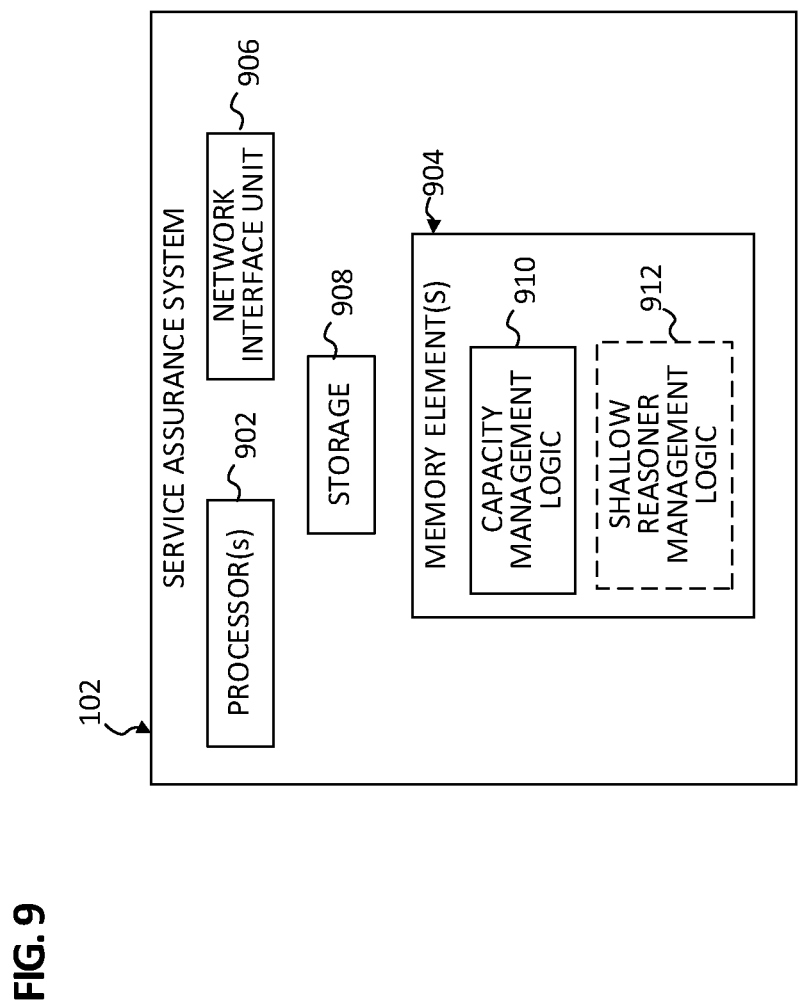

Referring to FIG. 9, FIG. 9 is a simplified block diagram illustrating example details that can be associated with service assurance system 102 in accordance with various potential embodiments of communication system 10. As shown in the embodiment of FIG. 9, service assurance system 102 can include one or more processor(s) 902, one or more memory element(s) 904, a network interface unit 906 and storage 908. Memory element(s) 904 can include instructions for capacity management logic 910. In at least one embodiment, memory element(s) 904 can include instructions for shallow reasoner management logic 912. In various embodiments, service assurance system 102 can be implemented: as a data center compute node such as a server, rack of servers, multiple racks of servers, etc. for a data center; as a cloud compute node, which can be distributed across one or more data centers; as a collection of service assurance elements or systems (e.g., an Operations Support System (OSS), a Network Management System (NMS), an OAM system, etc.); as combinations thereof or the like.

In at least one embodiment, processor(s) 902 is/are at least one hardware processor configured to execute various tasks, operations and/or functions for service assurance system 102 as described herein according to software and/or instructions configured for service assurance system 102. In at least one embodiment, memory element(s) 904 is/are configured to store data, information, software and/or instructions associated with service assurance system 102 and logic configured for memory element(s) 904. In some embodiments, service assurance system 102 can include a bus (not shown) as discussed herein. In various embodiments, network interface unit 906 enables communication between service assurance system 102, collector element 100 and/or VNFM 104 to facilitate operations discussed for various embodiments described herein. In some embodiments, network interface unit 906 can be configured with one or more Ethernet driver(s) and/or controller(s) or other similar network interface driver(s) and/or controller(s) to enable communications for service assurance system 102 within communication system 10. In various embodiments storage 908 can be configured to store data, information and/or instructions associated with service assurance system 102 and/or logic configured for memory element(s) 904.

In at least one embodiment, capacity management logic 910 can include instructions that cause service assurance system 102 to manage (e.g., scale up or scale down) capacity for one or more service function(s) and/or service chain(s) based on notifications received from collector element 100 and/or VNFM 104. Capacity management logic 910 can further include instructions that cause service assurance system 102 to send scale up and/or scale down notifications to VNFM 104.

In at least one embodiment, memory element(s) 904 can include instructions for shallow reasoner management logic 912 that, when executed by processor(s) 902, causes service assurance system 102 to configure one or more queries to communicate to collector element 100 for shallow reasoning operations to be performed by collector element 100 on measurement information received from one or more VFNs as described herein.

Figure 10:
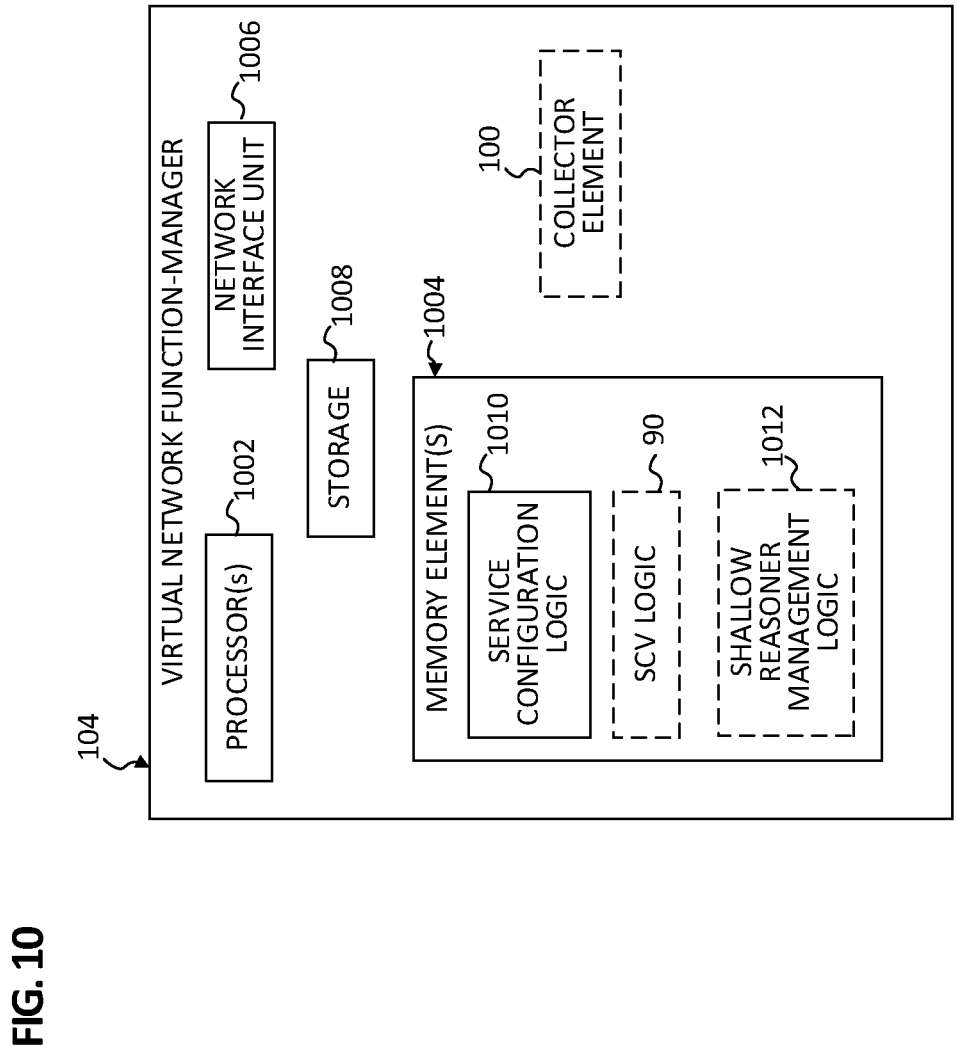

Referring to FIG. 10, FIG. 10 is a simplified block diagram illustrating example details that can be associated with Virtual Network Function-Manager (VNFM) 104 in accordance with various potential embodiments of communication system 10. As shown in the embodiment of FIG. 10, VNFM 104 can include one or more processor(s) 1002, one or more memory element(s) 1004, a network interface unit 1006 and storage 1008. Memory element(s) 1004 can include instructions for service configuration logic 1010. In at least one embodiment, memory element(s) 1004 can include instructions for service chain verification (SCV) logic 90. In at least one embodiment, memory element(s) 1004 can include instructions for shallow reasoner management logic 1012. In at least one embodiment, VNFM 104 can be configured with collector element 100. In various embodiments, VNFM 104 can be implemented: as a data center compute node such as a server, rack of servers, multiple racks of servers, etc. for a data center; as a cloud compute node, which can be distributed across one or more data centers; as combinations thereof or the like.

In at least one embodiment, processor(s) 1002 is/are at least one hardware processor configured to execute various tasks, operations and/or functions for VNFM 104 as described herein according to software and/or instructions configured for VNFM 104. In at least one embodiment, memory element(s) 1004 is/are configured to store data, information, software and/or instructions associated with VNFM 104 and logic configured for memory element(s) 1004. In some embodiments, VNFM 104 can include a bus (not shown) as discussed herein. In various embodiments, network interface unit 1006 enables communication between VNFM 104, service assurance system 102 and any virtualized resources configured for communication system 10. In some embodiments, network interface unit 1006 can be configured with one or more Ethernet driver(s) and/or controller(s) or other similar network interface driver(s) and/or controller(s) to enable communications for VNFM 104 within communication system 10. In various embodiments storage 1008 can be configured to store data, information and/or instructions associated with VNFM 104 and/or logic configured for memory element(s) 1004.

In at least one embodiment, service configuration logic 1010 can include instructions that cause VNFM 104 to configure, instantiate and/or cancel one or more service function(s) and/or service chain(s) including any NFVI associated therewith based on notifications (e.g., scale up, scale down) received from service assurance system 102.

In at least one embodiment, memory element(s) 1004 can include instructions for SCV logic 90 that, when executed by processor(s) 1002, causes VNFM 104 to provide proof of transit functionality for determining whether any packets for any service chains may not be handled correctly (e.g., may have missed a service on a service chain, etc.). In various embodiments, instructions for SCV logic 90 can provide functionality to interact with VFNs (e.g., VFN-CL 60, VFN-ST(1)-(3) 70-72) to send security configuration information to the VFNs, to receive notifications when a packet(s) fail service chain verification and/or to perform service chain verification for a particular service chain (e.g., for embodiments in which the SCV logic performs service chain verification itself and is in a different trust domain than a given service chain). Instructions for SCV logic 90 can further be configured to interact with service configuration logic 1010 and/or any other logic configured for VNFM 104 to perform any other operations described herein.

In at least one embodiment, memory element(s) 1004 can include instructions for shallow reasoner management logic 1012 that, when executed by processor(s) 1002, causes VNFM 104 to configure one or more queries to communicate to VFNs for shallow reasoning operations to be performed by VFNs on in-band metadata for service chain verification for one or more packets as described herein.

In regards to the internal structure associated with communication system 10, any compute node, network element, agent, and/or manager can be configured to include a respective at least one processor and a respective at least one memory element in accordance with various embodiments. In addition, in some embodiments, storage can be configured for any such node, element, agent and/or manager. Hence, appropriate software, hardware and/or algorithms are being provisioned for communications system 10 in order to facilitate operations as described for various embodiments discussed herein to facilitate managing chained services in a network environment.

In one example implementation, compute nodes, network elements, agents and/or managers can encompass network appliances, servers, routers, switches, gateways, bridges, loadbalancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIGS. 1A-1B, etc.). Alternatively, one or more of the compute nodes, elements, etc. discussed herein can include software (or reciprocating software) that can coordinate in order to achieve operations associated with managing chained services in a network environment, as outlined herein. In still other embodiments, one or more of the compute nodes, network elements, etc. may include any suitable algorithms, hardware, software, components, modules, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, the computing nodes, network elements, managers, etc. discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to the compute nodes, network elements, etc. discussed herein could be provided in any database, register, control list, cache, and/or storage structure: all of which can be referenced at any suitable timeframe. Any such storage options may be included within the broad term 'memory element' as used herein. Similarly, any of the potential processing nodes, elements, modules, controllers, managers, logic and/or machines described herein should be construed as being encompassed within the broad term 'processor'. Each of the compute nodes, network elements, managers, etc. discussed herein can also include suitable interfaces for receiving, transmitting, and/or otherwise communicating data or information in a network environment.

Note that in certain example implementations, operations as outlined herein may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element [as shown in FIGS. 3 and 7-10] can store data used for operations described herein. This includes memory elements being able to store software, logic, code, and/or processor instructions that are executed to carry out operations described herein. A processor (e.g., a hardware processor) can execute any type of instructions associated with data to achieve the operations detailed herein. In one example, a processor [as shown in FIGS. 3 and 7-10] could transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of the compute nodes, elements, managers, etc. discussed for various embodiments described herein can couple to one another through simple interfaces (as illustrated) or through any other suitable connection (wired or wireless), which provides a viable pathway for network communications. Additionally, any one or more of these compute nodes, elements, etc. may be combined or removed from a given deployment based on particular configuration needs. Communications in a network environment are referred to herein as 'messages', 'messaging' and/or 'signaling', which may be inclusive of communications using packets.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 10 may be applicable to other exchanges or routing protocols, interfaces and/or communications standards, proprietary and/or non-proprietary. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    setting, at a classifier node, a measurement indication within a header of a packet, wherein the measurement indication indicates to one or more service functions that the packet is a measurement and data packet;
    forwarding the packet through a service chain comprising the one or more service functions;
    upon determining that the measure indication within the header of the packet is set, recording measurement information for the packet as it is forwarded through the service chain;
    after the packet is forwarded through the service chain, determining by evaluating the packet, that the packet failed to traverse a first service function of the service chain;
    collecting the measurement information for the first service function; and
    managing capacity for the service chain based, at least in part, on the measurement information.

2. The method of claim 1, further comprising:
    determining end-to-end measurement information for the service chain using the recorded measurement information.

3. The method of claim 1, wherein managing capacity for the service chain further comprises:
    identifying a particular service function as a bottleneck service function for the service chain; and
    increasing capacity for the bottleneck service function.

4. The method of claim 3, wherein increasing capacity for the bottleneck service function includes at least one of:
    instantiating additional instances of the bottleneck service function; and
    instantiating additional instances of the service chain.

5. The method of claim 1, wherein managing capacity for the service chain further comprises:
    identifying that a particular service function or the service chain is underutilized; and
    decreasing capacity for the particular service function or the service chain.

6. The method of claim 5, wherein decreasing capacity for the particular service function or service chain includes:
    cancelling the particular service function or service chain.

7. The method of claim 1, wherein configuring the measurement indication for the packet includes setting an Operations and Administration (OAM) bit within a Network Service Header that is encapsulated with the packet.

8. The method of claim 1, wherein the measurement information includes one or more of:
    a time stamp associated with a time when the packet is received at an ingress interface associated with the service chain;
    a time stamp associated with a time when the packet is received by a forwarding node associated with a particular service function of the service chain;
    a time stamp associated with a time when the packet is placed in an output queue of a forwarding node to be sent to a particular service function of the service chain associated with the forwarding node;
    a time stamp associated with a time when the packet is received from a particular service function by a forwarding node associated with the particular service function of the service chain; and a time stamp associated with a time when the packet is added to an output queue for an egress interface associated with the service chain.

9. One or more non-transitory tangible media encoding logic that includes instructions for execution that when executed by a processor, is operable to perform operations comprising:

setting, at a classifier node, a measurement indication within a header of a packet, wherein the measurement indication indicates to one or more service functions that the packet is a measurement and data packet;

forwarding the packet through a service chain comprising the one or more service functions;

upon determining that the measure indication within the header of the packet is set, recording measurement information for the packet as it is forwarded through the service chain;

after the packet is forwarded through the service chain, determining by evaluating the packet, that the packet failed to traverse a first service function of the service chain;

collecting the measurement information for the first service function; and managing capacity for the service chain based, at least in part, on the measurement information.

10. The media of claim 9, the operations further comprising:

determining end-to-end measurement information for the service chain using the recorded measurement information.

11. The media of claim 9, wherein managing capacity for the service chain further comprises:

identifying a particular service function as a bottleneck service function for the service chain; and increasing capacity for the bottleneck service function.

12. The media of claim 11, wherein increasing capacity for the bottleneck service function includes at least one of:

instantiating additional instances of the bottleneck service function; and instantiating additional instances of the service chain.

13. The media of claim 9, wherein managing capacity for the service chain further comprises:

identifying that a particular service function or the service chain is underutilized; and decreasing capacity for the particular service function or the service chain.

14. The media of claim 9, wherein configuring the measurement indication for the packet includes setting an Operations and Administration (OAM) bit within a Network Service Header that is encapsulated with the packet.

15. A system comprising:

a compute node comprising at least one first memory element for storing first data and at least one first processor that executes instructions associated with the first data, wherein the compute node, when the at least one first processor executes the instructions, being configured to:

set, at a classifier node, a measurement indication within a header of a packet, wherein the measurement indication indicates to one or more service functions that the packet is a measurement and data packet;

forward the packet through a service chain comprising the one or more service functions; and upon determining that the measure indication within the header of the packet is set, record measurement information for the packet as it is forwarded through the service chain;

after the packet is forwarded through the service chain, determining by evaluating the packet, that the packet failed to traverse a first service function of the service chain;

collecting the measurement information for the first service function; and a service assurance system comprising at least one second memory element for storing second data and at least one second processor that executes instructions associated with the second data, wherein the service assurance system, when the at least one second processor executes the instructions, being configured to:

manage capacity for the service chain based, at least in part, on the measurement information.

16. The system of claim 15, wherein the service assurance system, when the at least one second processor executes the instructions, being configured to:

determine end-to-end measurement information for the service chain using the recorded measurement information.

17. The system of claim 15, wherein managing capacity for the service chain further comprises:

identifying a particular service function as a bottleneck service function for the service chain; and increasing capacity for the bottleneck service function.

18. The system of claim 17, wherein increasing capacity for the bottleneck service function includes at least one of:

instantiating additional instances of the bottleneck service function; and instantiating additional instances of the service chain.

19. The system of claim 17, wherein the measurement information includes one or more of:

a time stamp associated with a time when the packet is received at an ingress interface associated with the service chain;

a time stamp associated with a time when the packet is received by a forwarding node associated with a particular service function of the service chain;

a time stamp associated with a time when the packet is placed in an output queue of a forwarding node to be sent to a particular service function of the service chain associated with the forwarding node;

a time stamp associated with a time when the packet is received from a particular service function by a forwarding node associated with the particular service function of the service chain; and a time stamp associated with a time when the packet is added to an output queue for an egress interface associated with the service chain.

* * * * *

UNITED STATES PATENT AND TRADEMARK OFFICE
CERTIFICATE OF CORRECTION

PATENT NO. : 10,361,969 B2
APPLICATION NO. : 15/252028
DATED : July 23, 2019
INVENTOR(S) : Hendrikus G. P. Bosch et al.

Page 1 of 1

It is certified that error appears in the above-identified patent and that said Letters Patent is hereby corrected as shown below:

In the Specification

In Column 3, Line 37, delete "(EISI)" and insert -- (ETSI) --, therefor.

In Column 7, Line 52, delete "Card(s))" and insert -- Card(s)). --, therefor.

In Column 13, Line 15, delete "VFNCI(1)" and insert -- VNFCI(1) --, therefor.

In Column 24, Line 61, delete "VFNCI" and insert -- VNFCI --, therefor.

Signed and Sealed this
Twenty-fourth Day of September, 2019

Andrei Iancu
*Director of the United States Patent and Trademark Office*